(12) United States Patent
Foster et al.

(10) Patent No.: US 8,065,954 B2
(45) Date of Patent: Nov. 29, 2011

(54) COOKING DEVICE

(75) Inventors: Paul Lincoln Foster, Lincoln, RI (US); Del Moffat Thornack, Concord, CA (US)

(73) Assignee: Spinfry, Inc., Kelowna, British Columbia (CA)

( * ) Notice: Subject to any disclaimer, the term of this patent is extended or adjusted under 35 U.S.C. 154(b) by 627 days.

(21) Appl. No.: 12/193,618

(22) Filed: Aug. 18, 2008

(65) Prior Publication Data

US 2009/0044706 A1    Feb. 19, 2009

Related U.S. Application Data

(63) Continuation-in-part of application No. 11/693,143, filed on Mar. 29, 2007.

(60) Provisional application No. 61/044,733, filed on Apr. 14, 2008.

(51) Int. Cl.
*A47J 37/12* (2006.01)

(52) U.S. Cl. ............................................ 99/336; 99/409

(58) Field of Classification Search ............ 99/411–418, 99/352–355, 357, 348; 426/464, 518, 523, 426/637, 438, 473; 241/92; 210/DIG. 8, 210/167

See application file for complete search history.

(56) References Cited

U.S. PATENT DOCUMENTS

| | | | |
|---|---|---|---|
| 241,631 | A | 5/1881 | Duffy |
| 1,316,827 | A | 9/1919 | Brunner |
| 1,759,921 | A | 5/1930 | Tarpley |
| 2,186,345 | A | 1/1940 | Reidenbach |
| 2,568,792 | A | 9/1951 | Cripps |
| 2,628,762 | A | 2/1953 | Spalding |

(Continued)

FOREIGN PATENT DOCUMENTS

FR    2846218    4/2004

(Continued)

OTHER PUBLICATIONS

Final Office Action dated Dec. 24, 2009 for U.S. Appl. No. 11/693,143.

(Continued)

*Primary Examiner* — Tu B Hoang
*Assistant Examiner* — Thien Tran
(74) *Attorney, Agent, or Firm* — Snell & Wilmer L.L.P.

(57) ABSTRACT

The present invention relates to a food fryer. The food frying apparatus generally comprises two sections: a frying section and an oil removal section. The frying section houses and/or heats oil for frying the food, and the oil removal section is operable to reduce the oil content of the food. Exemplary embodiments of the invention comprise a basket well that is configured to be movable between a cooking section and a spinning section. The basket well may be configured to comprise a bearing surface and a basket well gear. The fryer device may further comprise a frame that comprise a bearing configured to interface with the bearing surface. Further, the fryer device may comprise a rotational motor that comprises a spinning gear configured to interface with the basket well gear. The fryer device may also comprise a drawer configured to be slidably removable from the fryer device. The fryer device may also comprise a retrofit fryer device configured to be adaptable to pre-existing fryer devices. In other embodiments, the fryer device may be configured to be operated at least in part by a processor, and the processor may receive instructions from a storage medium. Various aspects of the fryer device are configured to be automatically controlled.

13 Claims, 19 Drawing Sheets

U.S. PATENT DOCUMENTS

| | | | |
|---|---|---|---|
| 2,674,938 A | | 4/1954 | Tagliaferri et al. |
| 2,858,762 A | | 11/1958 | Wade |
| 3,078,786 A | | 2/1963 | Arvan |
| 3,078,988 A | | 2/1963 | Dunning |
| 3,200,737 A | | 8/1965 | Ferenc |
| 3,279,353 A | | 10/1966 | Shelor |
| 3,357,685 A | | 12/1967 | Stephens |
| 3,512,473 A | | 5/1970 | Moore et al. |
| 3,525,299 A | | 8/1970 | Gouwens et al. |
| 3,827,985 A | * | 8/1974 | Haan .................. 210/179 |
| 3,908,531 A | | 9/1975 | Morley |
| 4,187,770 A | | 2/1980 | Coffield |
| 4,196,660 A | | 4/1980 | Steinberg |
| 4,294,166 A | * | 10/1981 | Takeuchi ................ 99/348 |
| 4,372,980 A | * | 2/1983 | Luebke et al. .......... 426/231 |
| 4,426,794 A | * | 1/1984 | Vanderheijden .......... 34/109 |
| 4,508,026 A | | 4/1985 | Anetsberger et al. |
| 4,719,850 A | | 1/1988 | Sowell |
| 4,722,267 A | * | 2/1988 | Galockin et al. ......... 99/357 |
| 5,010,805 A | | 4/1991 | Ferrara |
| 5,027,697 A | | 7/1991 | De Longhi |
| 5,168,797 A | | 12/1992 | Wang |
| 5,379,684 A | * | 1/1995 | Ettridge ............... 99/336 |
| 5,469,778 A | | 11/1995 | Prudhomme |
| 5,543,166 A | | 8/1996 | Masel et al. |
| 5,586,486 A | | 12/1996 | Nitschke et al. |
| 5,611,265 A | * | 3/1997 | Ronci et al. ............ 99/353 |
| 5,771,781 A | | 6/1998 | Sham |
| 5,937,741 A | | 8/1999 | Manger |
| 5,993,872 A | | 11/1999 | Rolle et al. |
| 6,322,831 B1 | | 11/2001 | Mote et al. |
| RE37,706 E | | 5/2002 | Chung |
| D462,567 S | | 9/2002 | Smith |
| 6,732,552 B2 | * | 5/2004 | Kim et al. .............. 68/12.26 |
| 6,834,577 B2 | | 12/2004 | Xu |
| 2002/0088350 A1 | * | 7/2002 | Backus et al. ............ 99/419 |
| 2003/0192435 A1 | | 10/2003 | McNair |
| 2004/0060456 A1 | * | 4/2004 | Chung ................... 99/407 |

FOREIGN PATENT DOCUMENTS

| | | |
|---|---|---|
| GB | 1 282 713 | 7/1968 |
| GB | 1337547 | 11/1973 |
| GB | 2295768 | 6/1996 |
| WO | WO9423625 | 10/1994 |
| WO | WO9617541 | 6/1996 |
| WO | WO9725910 | 7/1997 |
| WO | 9739670 | 10/1997 |
| WO | WO 01/91580 | 12/2001 |
| WO | 2008103056 | 8/2008 |

OTHER PUBLICATIONS

Advisory Action dated Feb. 3, 2010 for U.S. Appl. No. 11/693,143.
Examiner's Answer to Appeal Brief, dated Jun. 23, 2010 for U.S. Appl. No. 11/693,143.
ISR and WO for PCT/US2009/040451 dated Sep. 28, 2009.
Office Action dated Jul. 22, 2009 for U.S. Appl. No. 11/693,143.
IPRP for PCT/US2007/008222 dated Oct. 8, 2009.
Motion Technology, Inc., Specifications of Ventless Electric Fryer Model MTI-10, 1 Page, 2008.
Moriera, Rosana G.; Castell-Perez, M. Elena; Barrufet, Maria A., Oil Absorption in Porous Food During Cooling, Deep Fat Frying, Jun. 1, 1999, pp. 202-221, Kluwer Academic Pub.
European Patent Office International Search Report and Written Opinion for PCT/US2007/008222, Feb. 6, 2008.
IPRP dated Oct. 28, 2010 for International Application No. PCT/US2009/040451.
Invitation to Pay Additional Fees and Partial Search Report for PCT/US2010/033692, Jun. 9, 2011.

* cited by examiner

COOKING DEVICE

CROSS REFERENCE TO RELATED APPLICATIONS

This application is a continuation-in-part of U.S. Nonprovisional application Ser. No. 11/693,143, filed on Mar. 29, 2007 and entitled FRYER DEVICE. This application also claims priority to and the benefit of U.S. Provisional Application Ser. No. 61/044,733, filed Apr. 14, 2008 and entitled FRYER DEVICE both of which are incorporated herein by reference.

FIELD OF THE INVENTION

The present invention relates to a fryer device. More specifically, the present invention relates to a fryer device that is capable of removing oil content from fried food.

BACKGROUND OF THE INVENTION

A popular method of cooking many food items is to fry or deep fry them. A brief list of foods that may be deep fried include french fries, potato chips, chicken, pork, beef, candy bars, ice cream, etc. Many other types of food are amenable to deep frying. Deep frying generally involves immersing the food item in a high-temperature, fat-based solution, such as cooking oil (e.g., canola oil, peanut oil, vegetable oil, olive oil, liquefied shortening etc.) until the food is cooked.

While fried foods have a certain appeal due to the particular taste and texture imparted to foods that are deep fried, such fried foods have some undesirable characteristics. For example, immersing foods in cooking oil results in additional fat being introduced into the food, and this fat is not generally beneficial to the person consuming the food. Furthermore, conventional deep frying methods generally do not attempt to remove this added fat. The added fat that is consumed with fried foods raises health concerns because a high level of fat in one's diet is generally not recommended for good health and nutrition. High quantities of saturated and trans fats such as those found in fried foods have been linked to adverse medical conditions.

Thus, some attempts have been made to remove fat from fried foods prior to serving the foods. These attempts, however, require some intervening process between the time the food is removed from the high-temperature oil and the time when the food is served to a consumer. The longer the time between removal from the oil and service to the consumer, the cooler the fried food becomes. As the fried food cools, the freshness and desirability of the fried food decreases at least in part to the change in texture of the fried food because of oil absorption. For example, when french fries begin to cool after being removed from the cooking oil, the outside of the french fries cools more rapidly than the inside. This difference in cooling rates between the outside and inside results in the oil soaking in and collecting in the center of the french fries, which results in soggy french fries containing excess oil. Studies of fried foods have shown that as much as eighty percent of the oil absorbed by the fried food is absorbed during this cooling process.

The prior art has attempted to introduce various means of removing oil from newly fried foods. For example, some prior art discloses the use of centrifuges and ultrasonic energy, sometimes in tandem to remove oil from fried foods. In the case of centrifuges, the prior art generally utilizes a center post or column to serve as the axis for the spinning cycle of the fryer. In some instances the center post is solid, while in other instances, the center post is hollow to allow for a drive shaft to be installed which shaft will spin the food basket when it is in the upper spin position. One issue with the utilization of a center shaft is that it generally requires a perforation of the vessel contain the frying oil and therefore may be prone to leakage of hot oils over time. In addition, such a center post structure may focus vibratory energy from the center post into the machine itself. Center posts also may cause issues with retrofitting of existing fryer vessels and maintenance of the equipment.

SUMMARY OF THE INVENTION

As set forth in the detailed description, in accordance with various embodiments of the present invention, systems, methods and apparatuses for frying food and removing oil content therefrom are disclosed. The food frying apparatus generally comprises two sections: a frying section and an oil removal section; other embodiments, however, may provide the oil removal section without providing the frying section. The frying section houses and/or heats oil for frying the food, and the oil removal section is operable to reduce the oil content of the food. A basket located within the apparatus may be moved between the two sections. Such movement may be accomplished manually or automatically, for example, by a motor and/or controller.

Exemplary embodiments of the invention comprise a basket well that is configured to be movable between a cooking section and a spinning section. The basket well may be configured to comprise a bearing surface and a basket well gear. The fryer device may further comprise a frame that comprise a bearing configured to interface with the bearing surface. Further, the fryer device may comprise a rotational motor that comprises a spinning gear configured to interface with the basket well gear.

The fryer device may also comprise a drawer configured to be slidably removable from the fryer device. The drawer may comprise a frame disposed within the slidable drawer and a basket well that is rotatably disposed within the frame. The drawer may further comprise a translational motor configured to translate the basket well between a cooking section proximate the drawer and a spinning section disposed within the drawer.

The fryer device may also comprise a retrofit fryer device configured to be adaptable to pre-existing fryer devices. The retrofit fryer device may comprise a housing that comprises a retrofit surface configured to be disposed proximate a pre-existing fryer device. The retrofit fryer device may further comprise a basket well that is rotatably disposed within the housing, such that the basket well is capable of being translated to the outside of the housing.

In other embodiments, the fryer device may be configured to be operated at least in part by a processor, and the processor may receive instructions from a storage medium. The storage medium may instruct the processor to receive an instruction relating to at least one of a food type, a cook time, a spin time, a cook temperature, a spin temperature, a spin speed, and a food result. The storage medium may further instruct the processor to translate a basket well to a cook section, and, after the cook time, translate the basket well to a spin section. The storage medium may also be configured to instruct the processor to rotate a spinning gear that interfaces with a basket well gear in order to spin the basket well for the spin time at the spin speed.

BRIEF DESCRIPTION OF THE DRAWINGS

The subject matter of the invention is particularly pointed out and distinctly claimed in the concluding portion of the specification. The invention, however, both as to structure and method of operation, may best be understood by reference to the following description taken in conjunction with the claims and the accompanying drawing figures, in which like parts may be referred to by like numerals.

DETAILED DESCRIPTION

Figure 1:
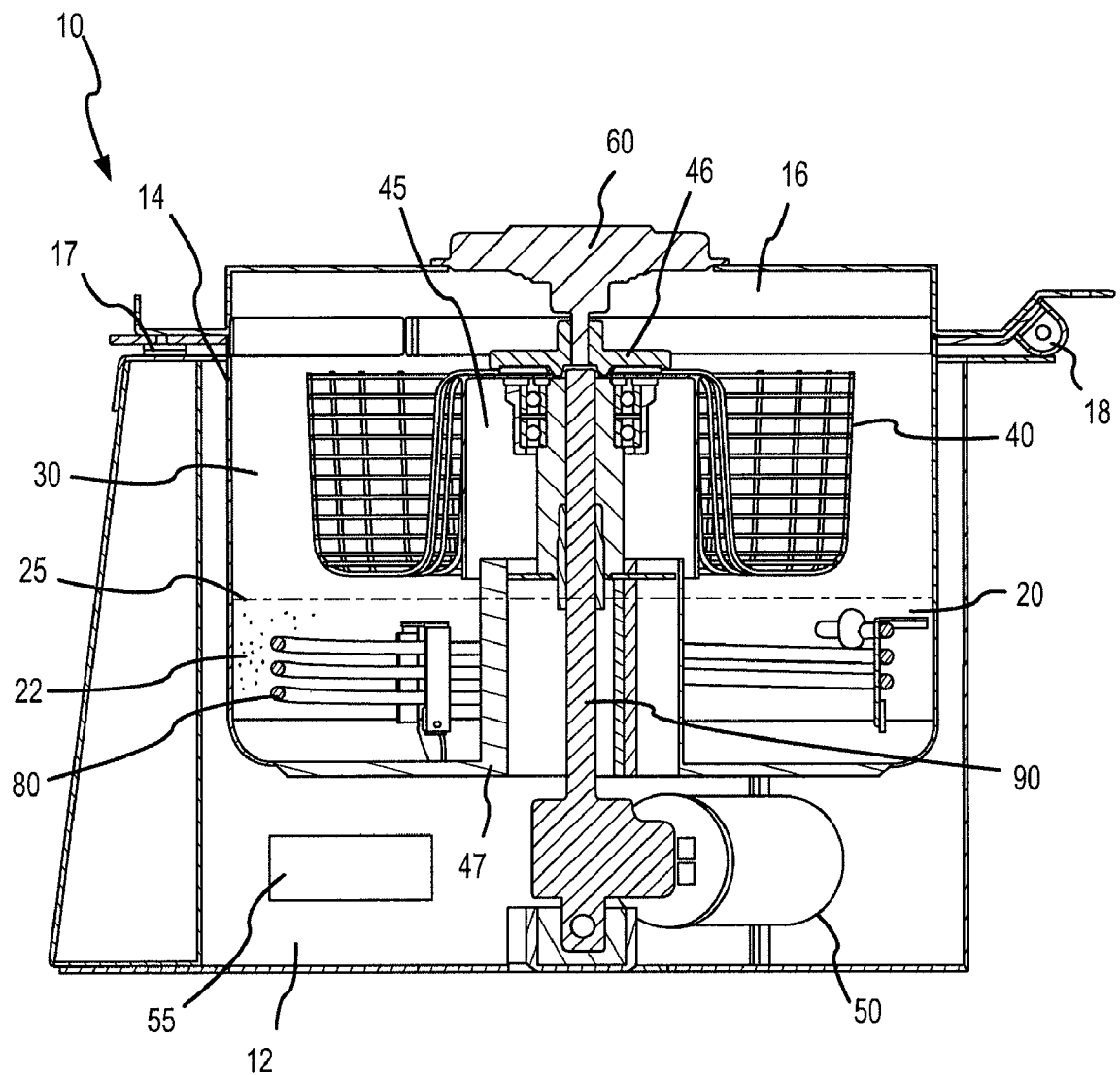
FIG. 1 illustrates a cross-section of a frying apparatus according to an exemplary embodiment of the present invention.

The detailed description herein makes use of various exemplary embodiments to assist in disclosing the present invention. While these exemplary embodiments are described in sufficient detail to enable those skilled in the art to practice the invention, it should be understood that other embodiments may be realized and that modifications of structures, arrangements, applications, proportions, elements, materials, or components used in the practice of the instant invention, in addition to those not specifically recited, can be varied or otherwise particularly adapted to specific environments, manufacturing specifications, design parameters or other operating requirements without departing from the scope of the present invention and are intended to be included in this disclosure. Thus, the detailed description herein is presented for purposes of illustration only and not of limitation.

In accordance with an exemplary embodiment of the present invention, the fryer device comprises an oil section where a food item is fried, and a spinning section where excess oil, grease, fat and the like are removed from the food while, at the same time, providing some degree of convection type cooking. The food is housed within a basket, and the basket is selectively movable between the oil section and the spinning section. A mechanism is employed that allows allowing movement of the basket between the oil section and the spinning section. At least one motor is employed to control operation of the fryer device. For example, in certain embodiments, one motor controls the movement of the basket between sections, and another motor controls the spinning of the basket. In various embodiments, the fryer device has a lid which is closed during the frying and spinning processes. In further embodiments, the fryer device comprises a drawer, and in still further embodiments, the fryer device does not comprise a cover and/or a drawer. In other embodiments, the fryer device comprises a filtering system for removing unwanted particles and debris from the cooking oil. In some embodiments of the invention, the fryer device further comprises various mechanisms for automating the processes involved with the fryer device. In yet other embodiments of the invention, a controller is provided which controls the operation of the various motors and processes to allow for substantially complete automation of the fryer device. In some embodiments, a solid shield or wall is employed around the basket well so as to detain and return oil and fat removed during the spin and/or oil removal cycles and then direct the return of that oil or fat to the frying vessel below.

According to a further exemplary embodiment of the invention, the fryer device provides a method for frying foods which comprises removing excess and/or unwanted fat, grease, oil, and the like, and simultaneously maintaining a desirable temperature within the food that is being cooked. The terms "cooking" and "frying" and formatives thereof are used interchangeably herein. Other mechanisms for cooking food besides frying fall within the scope of the present invention, such as boiling, blanching, steaming, poaching, simmering, steeping, and the like. For consistency, "frying" will be used throughout without limiting the methods of cooking for use in conjunction with embodiments of the present invention. Similarly, while "fryer device" may be used in this specification, it should be understood that any device capable of cooking and/or removing a liquid from a cooked food is contemplated within the scope of the invention.

Additionally, in certain embodiments of the invention, water may be used in place of cooking oil in order to boil, poach, blanch or otherwise cook certain foods. The foods are housed within the basket and cooked in heated water (or exposed to steam) from the water section, where the water section takes the place of the oil section. After cooking in the water, the basket is moved to the spinning section where excess water is removed so that the food does not get soggy from the excess water. Spinning and/or agitating the food also aids in preventing the food from sticking to itself. In other embodiments, water may be introduced to the cooking device during the spinning process in order to rinse starches and other products of the boiling process from the boiled food. Such foods that may be cooked by this process comprise pasta products and vegetables.

As noted above, foods that are fried tend to have excess oil at the surface as well as throughout the fried food. As the fried food cools, the outside of the food tends to cool first. The warmer inside temperature of the food draws the excess oil on the surface of the fried food to the inside of the food, resulting in an undesirable texture and taste of the fried food as well as limiting the shelf life of the food. This cooling process increases the amount of oil within the fried food, contrary to many health trends. Various embodiments of the present invention provide a mechanism for reducing this unwanted cooling during the excess oil removal process, leaving the excess oil at the surface of the fried food to be removed before it is drawn towards the center of the fried food, thereby resulting in a fried food that is healthier and more desirable than fried food produced by current methods.

According to various exemplary embodiments of the present invention, the fryer device is available in numerous sizes and/or capacities. For example, the fryer device is available in commercial sizes for use by restaurants and other food-frying establishments that must produce hundreds of pounds of fried food every day. Commercial fryer devices also range in size depending on the desired capacity for the commercial fryer. Other embodiments of the invention provide a fryer device that is amenable to use in a user's home. For example, the fryer device for personal use may produce as little as one serving of fried food. Such a personal fryer device may be configured to sit on a countertop in a personal residence. All sizes and capacities of the fryer device are contemplated within the scope of the present invention.

With reference to FIG. 1, an exemplary embodiment of the fryer device is now described. Fryer device 10 comprises a device housing 12 and a top cover 16. Top cover 16 comprises a spin motor 60. Device housing 12 comprises a frying vessel 14, a linear motor 50, and a controller 55. Frying vessel 14 comprises an oil section 20, a spinning section 30, a heating element 80, and a basket 40. A guide shaft 90 is configured to operate in conjunction with linear motor 50 and basket 40 to facilitate movement of basket 40 between oil section 20 and spinning section 30. In other embodiments, with momentary reference to FIGS. 6A-6C, frying vessel 14 may comprise a plurality of guide shafts 691, and other motors, gears, and mechanisms configured to facilitate movement of basket 40 (not shown in FIGS. 6A-6C) as discussed further below.

With reference again to FIG. 1, according to various embodiments of the invention, device housing 12 houses the components of fryer device 10 and protects the environment within fryer device 10 to enable the frying of the food within fryer device 10, and to protect a user from the high temperatures within fryer device 10. In some embodiments, device housing 12 comprises a thermal insulation material to maintain the outside of fryer device 10 at a reasonable and safe operating temperature.

In accordance with further embodiments of the invention, oil section 20 is located within device housing 12 and is configured to receive basket 40 in order to fry the food contained in basket 40. Oil section 20 is further configured to heat any type of oil that is capable of frying food in a manner that renders the food edible. Such oil may be cooking oil, vegetable oil, corn oil, peanut oil, canola oil, olive oil, and the like. Examples of food that may be cooked in cooking oil 22 are potatoes, chicken, pork, beef, candy bars, ice cream, etc. Basket 40 is adaptable to receive any type of food that may be cooked in oil section 20, and in various embodiments, different types, shapes, sizes, and/or configurations of baskets are available to cook different types of food in a manner configured to be suitable for serving and/or consumption. An oil level 25 is maintained in oil section 20 in order to allow for the sufficient immersion of basket 40 and/or the food to be cooked within cooking oil 22.

According to other embodiments of the invention, a mechanism for heating cooking oil 22 is provided. In exemplary embodiments, heating element 80 is in thermal contact with cooking oil 22 and is operable to heat cooking oil 22. In some embodiments, heating element 80 is also in physical contact with cooking oil 22, for example, heating element 80 may be located within oil section 20. In other embodiments of the invention, a thermally conductive material may be present between heating element 80 and cooking oil 22. For example, heating element 22 may be located outside of, but in thermal contact with frying vessel 14 which may have thermally conductive walls, or may have a partially thermally conductive wall proximate heating element 22. In yet other embodiments, where heating element 80 is located within oil section 20, frying vessel 14 may be thermally insulated in order to aid in maintaining the outside of fryer device 10 at a safe operating temperature. The heating element is operable to be driven by electricity, gas, solar power, and the like.

In other embodiments, heating element 80 is located within spinning section 80 and/or is located both within the spinning and oil sections. In still other embodiments, two heating elements may be used. For example, one heating element may be used to heat the oil in the oil section, and a second heating element may be used to aid in maintaining a desirable temperature in the spinning section. Employing a second heating element for heating the spinning section aids in increasing the amount of oil removed from the fried food. The higher the temperature during spinning, the less viscous the oil will be, so it is easier to spin the oil off. And the higher the temperature, the less oil that has been drawn to the center of the fried food. Thus, where spinning occurs at higher temperatures, more oil is available to be spun off the fried food because of the viscosity of the oil and because the food, in a heated state, is more able to shed the oil in and on it.

In accordance with another exemplary embodiment of the invention, spinning section 30 is operable to remove excess oil from the surface of the fried food at an elevated temperature. In such an embodiment, basket 40 may be a food spinner wherein the fried food is spun to remove the excess oil. In other embodiments, basket 40 is a centrifugal oil removal device, because the rotation of basket 40 aids in removing oil from the fried food. Spinning section 30 is proximate oil section 20 within frying vessel 14, and is disposed between oil section 20 and top cover 16. After food has been cooked in oil section 20, basket 40 is moved into spinning section 30 to facilitate removing excess oil from the cooked food. As the oil is removed from the food, the removed oil returns to oil section 20 for further use in frying, for removal from fryer device 10 and/or for filtering in order to reclaim the used oil.

According to other embodiments of the invention, with reference to FIGS. 6A-6C, 7A, 7B, 8 and 9, basket 640, 740, 840, 940 may be configured to reside within a basket well 642, 742, 842, 942. The basket well is configured to provide support to the basket and the food, and to allow the basket to be rotated to facilitate the removal of the oil from the fried food. For example, the basket well may comprise a shape similar to that of the basket so that the basket nests within the basket well. In certain embodiments, the basket well may comprise bottom members 643, 743, 843, 943 and side members 644, 744, 844, 944, and in other embodiments, the basket well may comprise only side members.

The basket well may further comprise a mesh basket (distinct from the food basket) that is configured to catch food residue that might be removed from the fried food product during the spinning stage. Additionally, in other embodiments, the basket well may be surrounded by a solid wall concentric with the basket well, wherein the solid wall is configured to redirect oil spun off of the cooked food so that the oil returns to the oil section. Such a configuration may also protect sensitive components of the fryer device from the hot oil. In still other embodiments, the fryer device may not comprise a food basket; rather, the mesh basket and/or other screen-type material or structure may be part of the basket well such that the basket wall may be configured to hold the food to be cooked.

In various embodiments, the basket well may comprise steel, stainless steel, ceramic material, composite materials, metals, and combinations thereof. In other embodiments, the basket well may comprise any material and any configuration capable of providing support to the basket and allowing the basket to be rotated to facilitate the removal of oil from the fried food.

In a further embodiment of the invention, and with reference to FIGS. 9 and 10A-10C, basket 940, 1040 may be configured to interface with basket-well 942 in order to facilitate the rotation of basket 940, 1040. Basket 1040 may comprise a key and/or keys 1041 that are configured to interface with bottom members 943 and/or side members 944 of basket well 942. For example, one embodiment is configured to allow keys 1041 to interface with bottom members 943 such that when basket well 942 rotates, bottom members 943 abut keys 1041 causing basket 940 to rotate. In another embodiment, keys 1041 are configured to interface with side members 944 such that when basket well 942 rotates, side members 944 abut keys 1041 causing basket 940 to rotate. In further embodiments, basket well 942 may comprise a female and/or male key and basket 940 may comprise a corresponding male and/or female key such that basket 940 is configured to rotate when basket well 942 rotates and when the corresponding male and female keys mate. While keys have been described, it should be understood that any other mechanism and/or structure configured to allow basket 940 to be removable from basket well 942 and to allow basket 940 to rotate when basket well 942 rotates are contemplated within the scope of the present invention. For example, keys 1041 may comprise fins, rods, pins, buttons, clips, snaps, fasteners, adhesives, and any other means now known or hereafter developed for removably allowing basket 940 to interface with basket well 942. However, in other embodiments, it may not be necessary for basket 940 to be removable from basket well 942. Moreover, the fryer device may not comprise basket 940, for example, where the basket well is configured to maintain the food within the basket well.

According to other embodiments of the invention, the basket well may reside within a frame structure disposed within the fryer device. As will be discussed further below, the frame structure may be configured to facilitate the rotation of the basket well and/or the translation of the basket well between the oil section and the spinning section. For example, the frame structure may comprise bearings, tracks, guide shafts, gears, belts, and the like for facilitating movement of the basket well. In other embodiments, the frame structure provides support for the basket well and the basket, such that the frame structure is configured to reduce or more evenly distribute vibration in the fryer device during the oil removal process, particularly when the food may be in an unbalanced position in the food basket. The frame structure may comprise any material suitable for providing the support and reducing the vibration discussed above, and for containing the components necessary to facilitate such purposes.

Further embodiments of the invention, with reference back to FIG. 1, provide a top cover 16 that is operable to maintain an elevated temperature within spinning section 30. Top cover 16 is proximate device housing 12, frying vessel 14, and spinning section 30. Top cover 16 is operable to separate the frying environment within fryer device 10 from the environment outside fryer device 10. Top cover 16 comprises a thermally insulating material that reduces temperature loss to the outside of fryer device 10 and that reduces the energy required to maintain fryer device 10 at a desirable operating temperature. The thermal insulating material also maintains the outside surface of top cover 16 at a temperature that is amenable to being touched by a user without injuring the user. Top cover 16 may also comprise a shock mount 17 that is operative to reduce vibration, shaking, movement and the like and a pivot 18 which is operative to provide rotational movement of top cover 16. Top cover 16 facilitates the maintenance of a desirable temperature within the food that is cooked by fryer device 10 while oil is being removed from the cooked food. For example, top cover 16 is designed to allow basket 40 to rotate within spinning section 30 while top cover 16 remains closed. It is not necessary, according to various embodiments of the invention, to open top cover 16 between frying the food and removing the oil from the food. In some embodiments of the invention, top cover 16 comprises spin motor 60 to facilitate spinning of basket 40 to remove oil from the food. In various embodiments, spin motor 60 may be powered by batteries, direct current, alternating current, solar power, gasoline, and the like.

Figure 11:
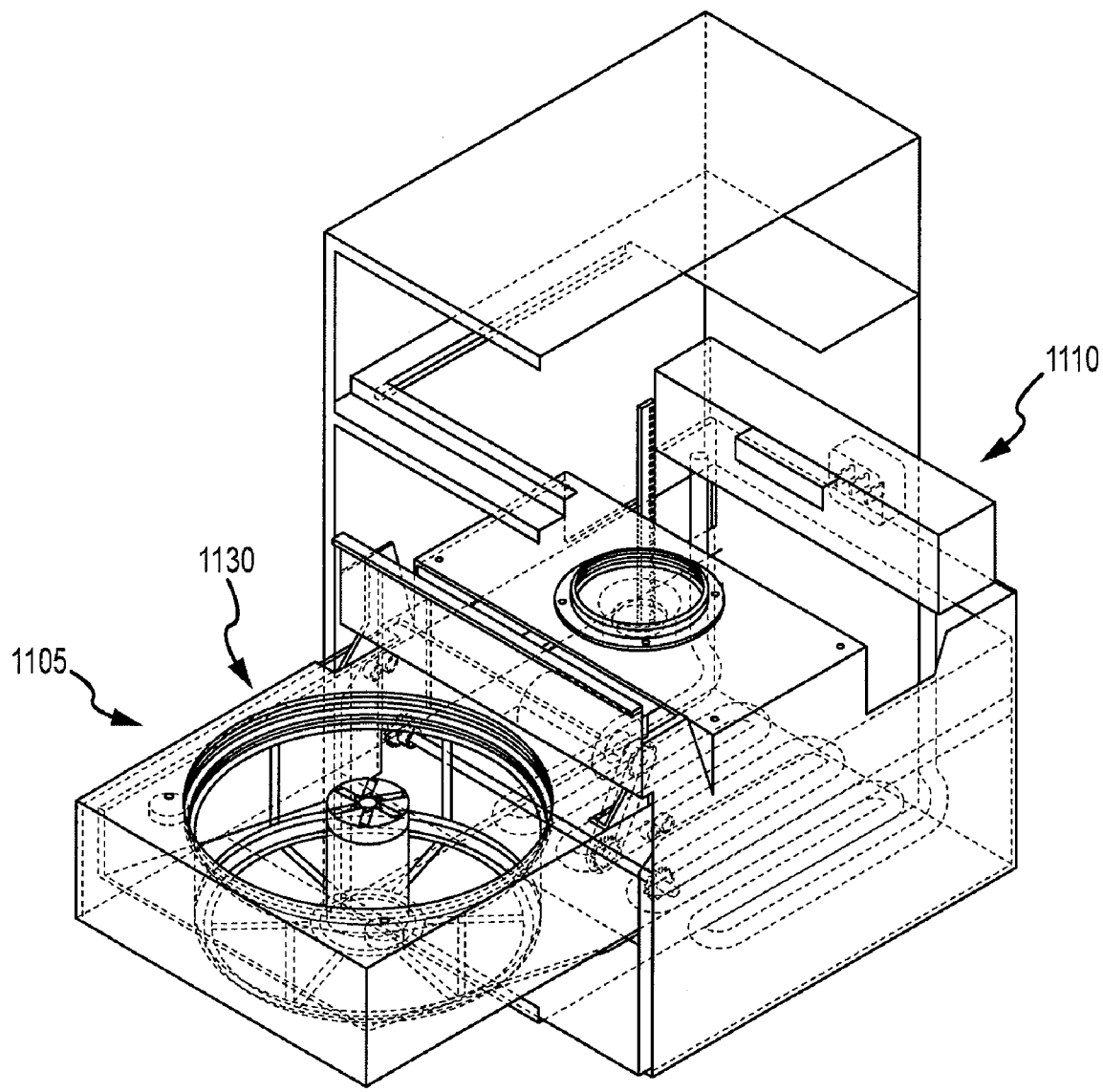
FIG. 11 illustrates a perspective view of a fryer device according to an exemplary embodiment of the present invention.
Figure 16:
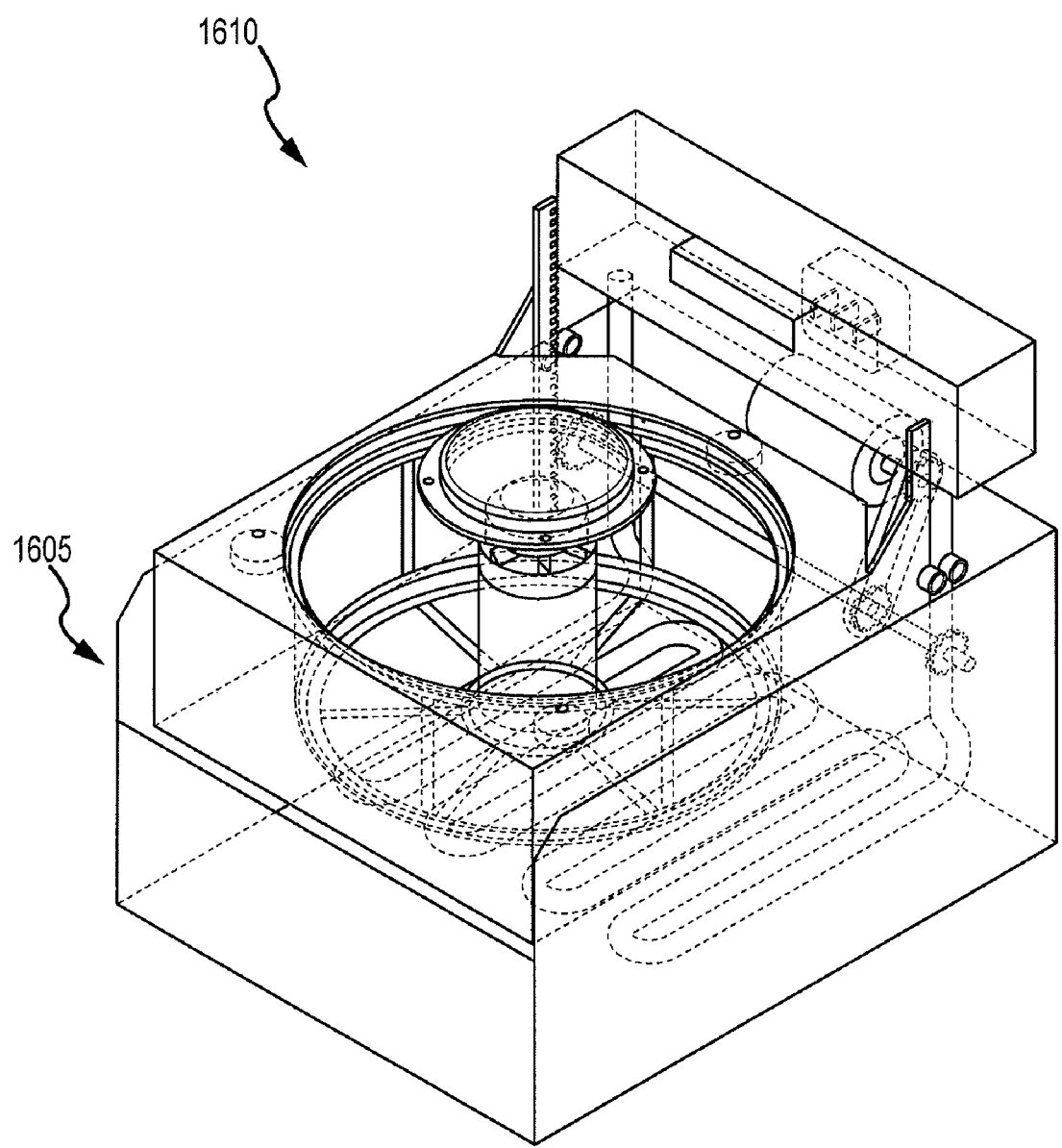
FIG. 16 illustrates a perspective view of a fryer device according to an exemplary embodiment of the present invention.
Figure 17:
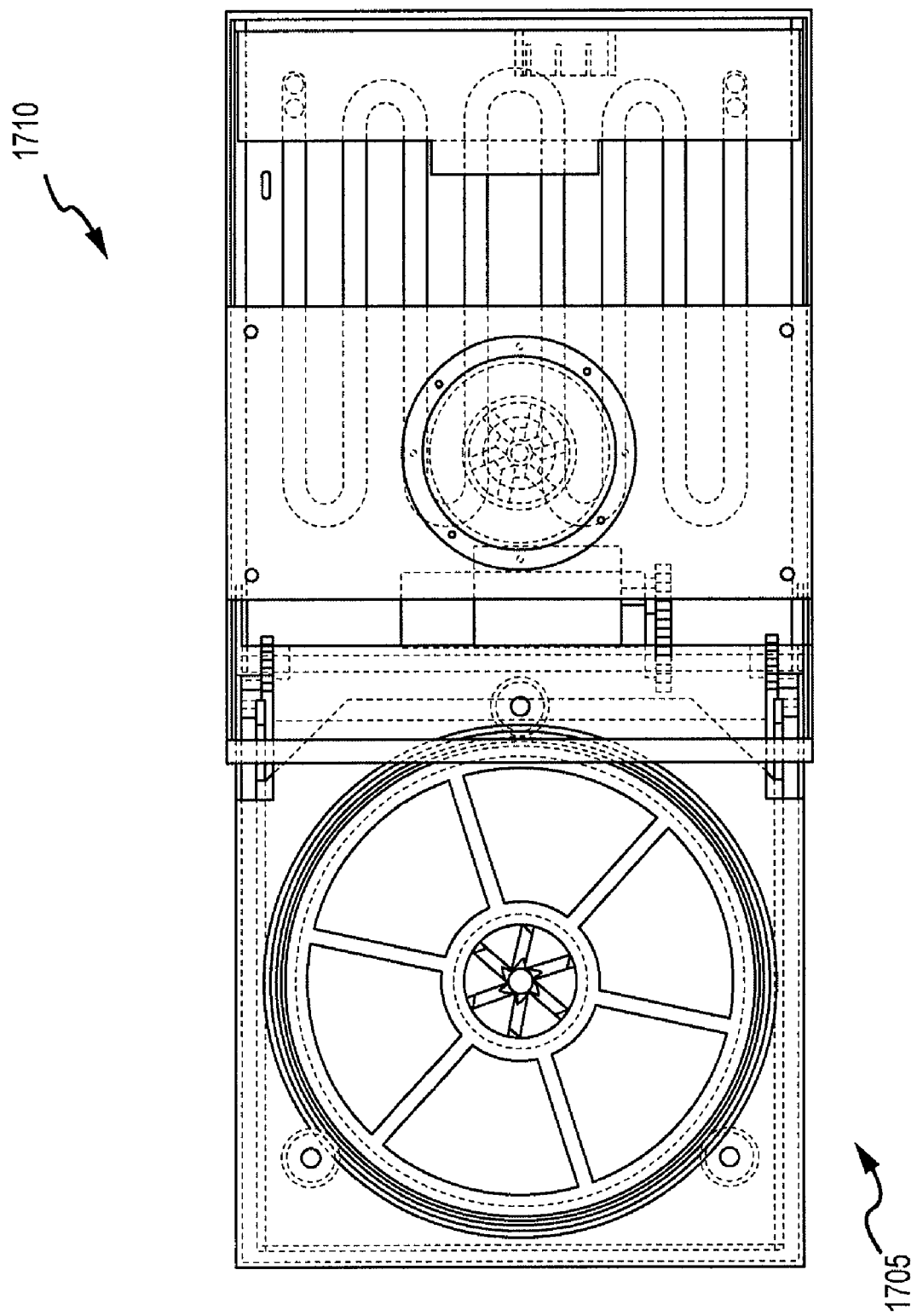
FIG. 17 illustrates a top view of a fryer device according to an exemplary embodiment of the present invention.

Other embodiments of the invention do not comprise top cover 16. Certain embodiments comprise a drawer 1105 configured to be slidably removable from fryer device 1110. For example, with reference to FIG. 11, drawer 1105 may be configured to comprise any of the components located in spinning section 1130. Drawer 1105 may also be configured to comprise any components utilized in the spinning of the oil from the fried food. In certain other embodiments, and as will be discussed below, drawer 1105 may be configured to allow the retrofitting of portions of the fryer device 1110, including but not limited to the portions of spinning section 1130, on to existing frying apparatuses. Drawer 1105 may be configured to comprise bearings to facilitate slidable movement of the drawer with respect to fryer device 1110. Fryer device 1110 may also comprise motors and/or gears to facilitate the automated movement of drawer 1105. In other embodiments, drawer 1105 may be manually slidable with respect to fryer device 1110. In further embodiments, drawer 1105 may contain the frame structure discussed above such that the components configured to allow movement of the basket well and the basket are removable from the fryer device when drawer 1105 is opened. Still other embodiments of the drawer are illustrated in FIGS. 16-17.

In some embodiments of the invention that comprise top cover 16, pressure may build within fryer device 10 during the frying and spinning processes. In order to relieve and/or release this pressure from fryer device 10, some embodiments comprise a mechanism to relieve the pressure, such as a pressure-relief valve 799 illustrated in FIG. 7C. Pressure-relief valve 799 is configured to substantially equalize the pressure between an internal portion of fryer device 10 and an external portion of fryer device 10. Any mechanism configured to substantially equalize the pressure may be used without departing from the scope of the present invention. Pressure relief valve 799 may be located anywhere on and/or in fryer device 10 that is configured to facilitate the substantial equalization of the pressure between the internal portion and the external portion.

Various components are operable to move basket 40 during the food frying and oil removal processes. In an exemplary embodiment of the invention, the motion of basket 40 within frying vessel 14 is controlled by linear motor 50, spin motor 60, guide shaft 90, basket support 45, basket coupling 46, basket lift mechanism 47, and controller 55. Basket 40 is coupled to basket support 45 which is coupled to basket lift mechanism 47. Basket lift mechanism 47 is coupled to linear motor 50, and linear motor 50 acts on lift mechanism 47 to facilitate moving basket 40 between oil section 20 and spinning section 30. For example, where oil section 20 is vertically-oriented with respect to spinning section 30, linear motor 50 vertically translates basket 40 between the two sections. In certain embodiments of the invention, linear motor 50 comprises a helical drive. In further embodiments, linear motor 50 comprises a direct drive motor, such that pulleys, belts, chains, and the like are not necessary for the motor to drive basket 40. In other embodiments, linear motor 50 comprises any device capable of automatically moving basket 40 between oil section 20 and spinning section 30. In yet other embodiments, basket 40 may be manually moved between the sections. In various embodiments, linear motor 50 may be powered by batteries, direct current, alternating current, solar power, gasoline, and the like.

With continued reference to FIG. 1, basket lift mechanism 47 sealably nests within basket support 45 so as to prevent cooking oil 22 from exiting oil section 20 and contaminating the basket lift mechanism. Basket 40 is attached to and receives basket support 45, thereby allowing linear motor 50 to move basket 40 between oil section 20 and spinning section 30. In accordance with various embodiments of the invention, basket 40 is cylindrical in shape, and basket support 45 is located centrally within basket 40. Guide shaft 90 runs centrally through basket 40, basket support 45, and basket lift mechanism 47 to facilitate the vertical movement of basket 40 between oil section 20 and spinning section 30.

Other embodiments of the present invention comprise a basket coupling 46 which interfaces with basket support 45 and spin motor 60 in order to allow spin motor 60 to rotate basket 40 about the basket's vertical axis. Basket coupling 46 interfaces with guide shaft 90, which causes basket support 45 to appropriately contact basket coupling 46 in order to allow spin motor 60 to rotate basket 40. In certain embodiments of the invention, spin motor 60 is a pancake-type motor. In other embodiments of the invention, spin motor 60 is any device capable of automatically rotating basket 40 within spinning section 30. In further embodiments, basket 40 may be manually rotated.

Figure 2:
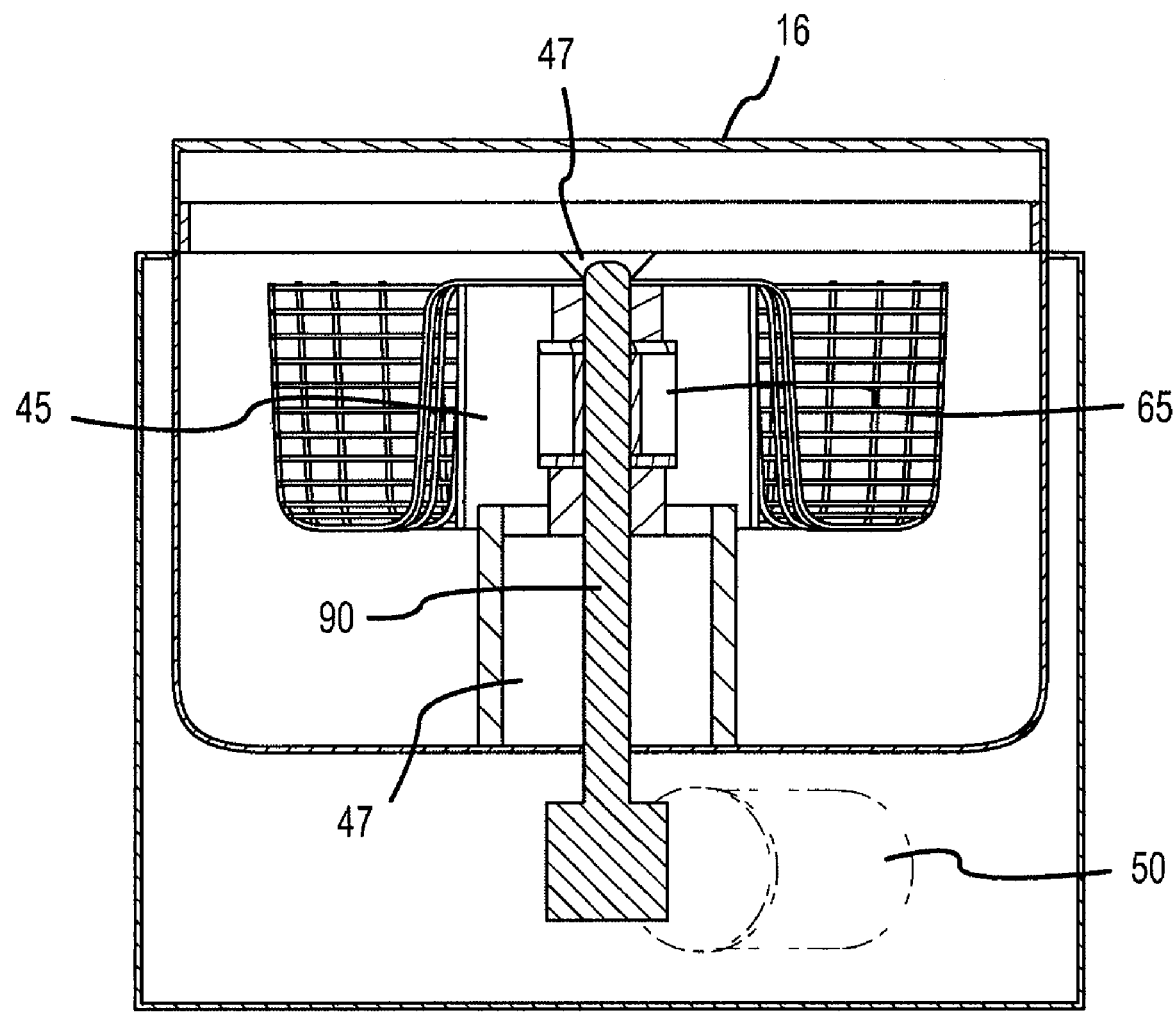
FIG. 2 illustrates a cross-section of a frying apparatus according to an exemplary embodiment of the present invention.

In other embodiments of the invention, other motor configurations are contemplated. With reference to FIG. 2, another embodiment of the present invention is shown. In this embodiment, spin motor 60 is not present within top cover 16; rather, rotational motor 65 is disposed within basket support 45 and/or basket lift mechanism 47. In such an embodiment, basket 40 is capable of rotating both in spinning section 30 and in oil section 20. Spinning may occur in both sections during the same frying process without removing top cover 16.

Figure 8:
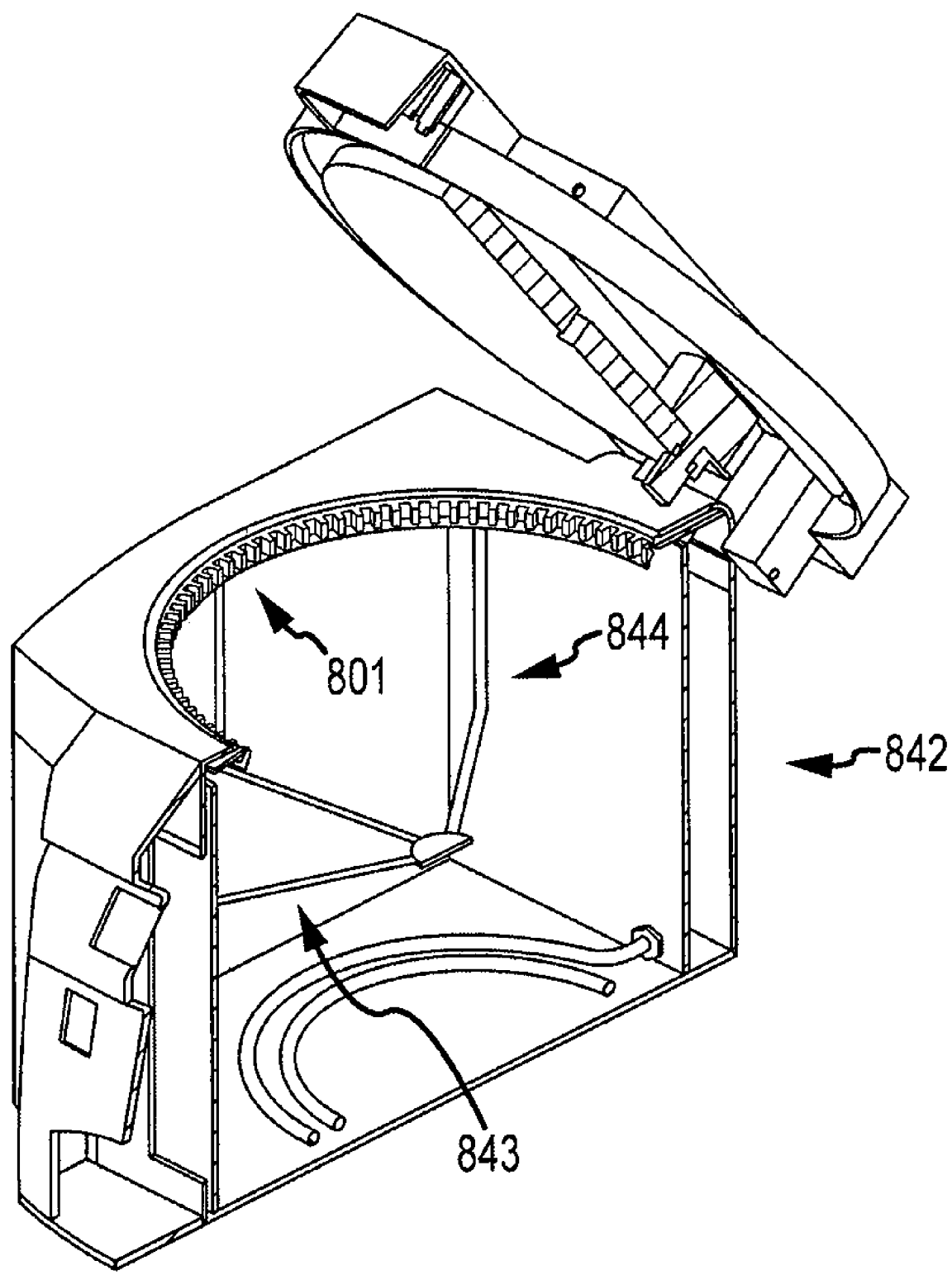
FIG. 8 illustrates a cut-away view of an exemplary embodiment of the present invention.
Figure 9:
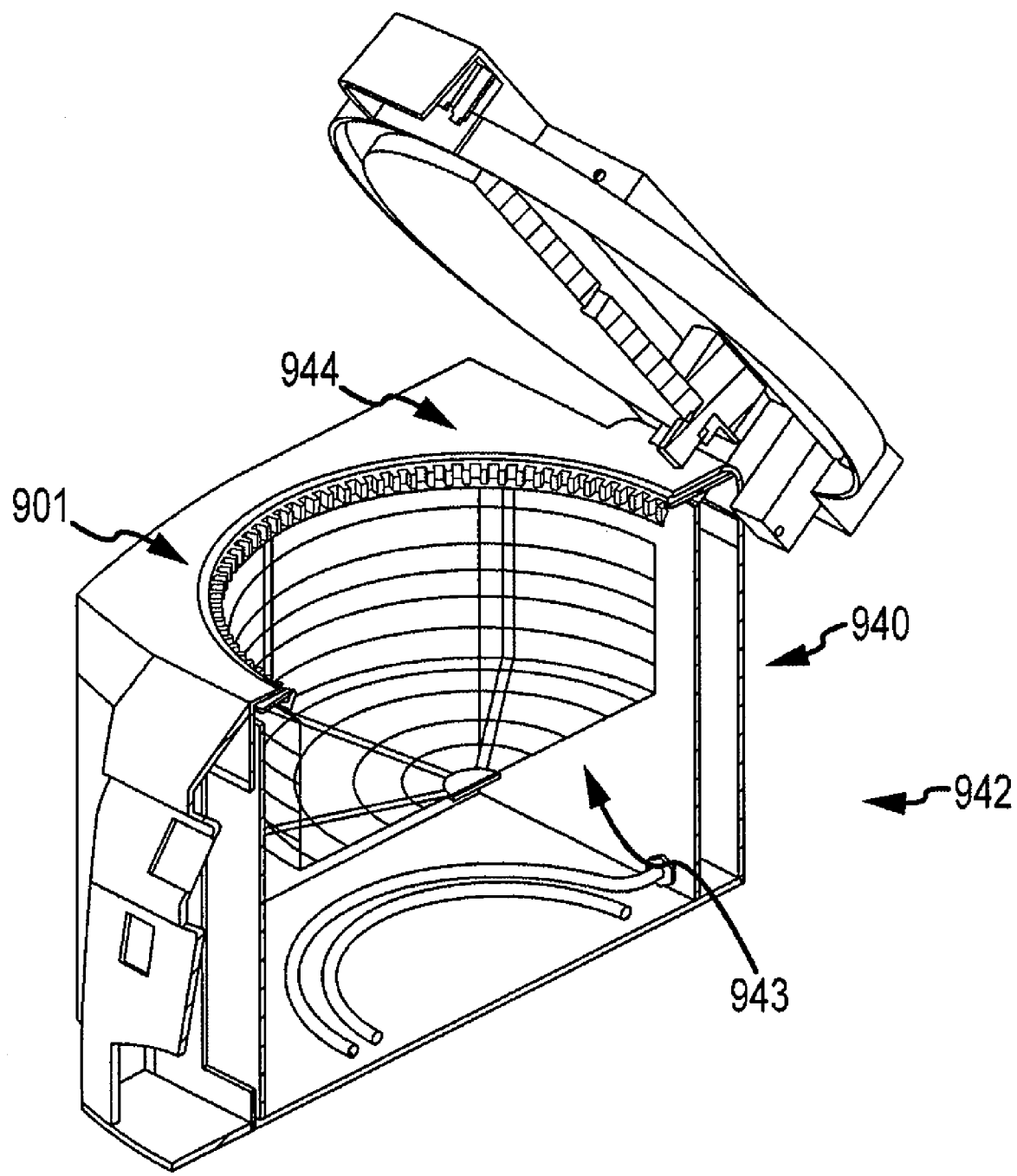
FIG. 9 illustrates a cut-away view of an exemplary embodiment of the present invention.
Figure 10A:
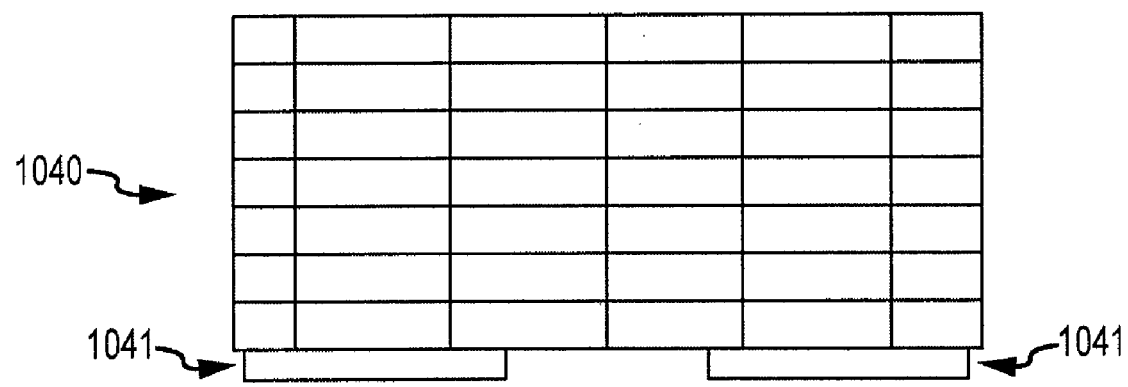
FIG. 10A illustrates a side view of a basket according to an exemplary embodiment of the present invention.
Figure 10B:
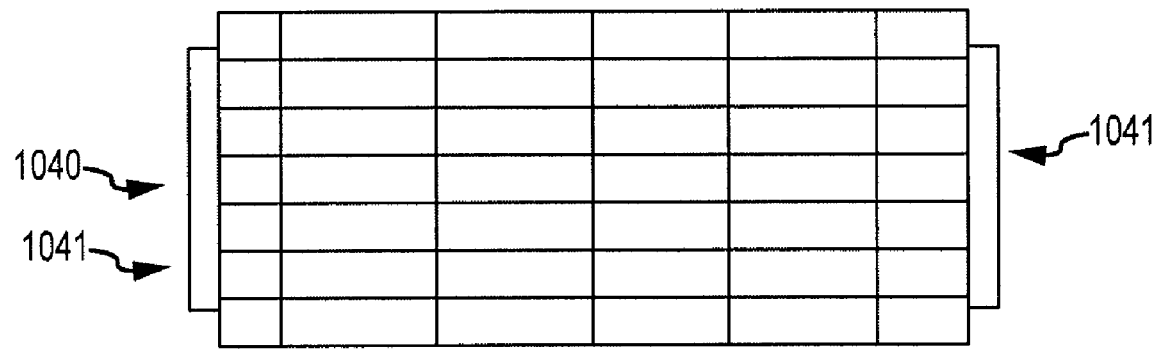
FIG. 10B illustrates a side view of a basket according to an exemplary embodiment of the present invention.
Figure 10C:
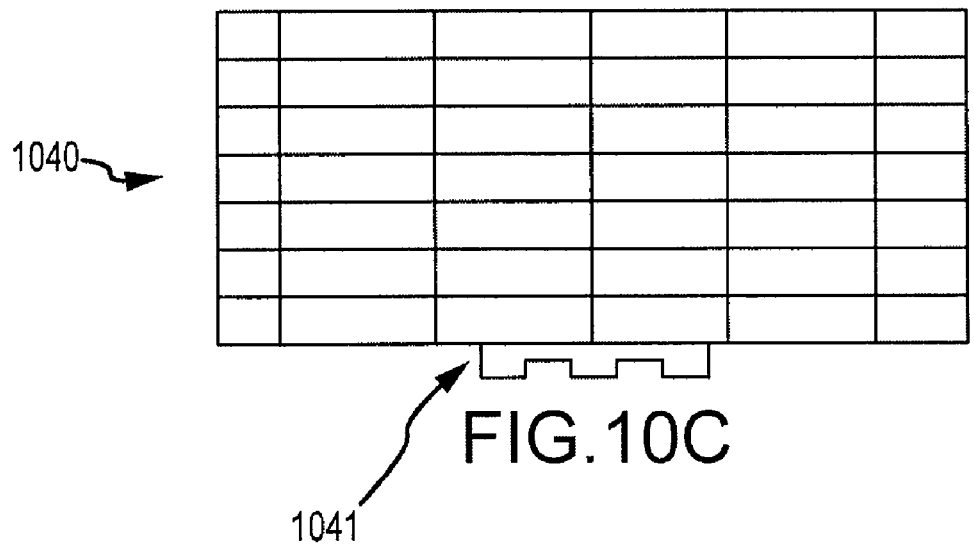
FIG. 10C illustrates a side view of a basket according to an exemplary embodiment of the present invention.

In still other embodiments of the invention, further motor configurations are contemplated. For example, with reference to FIGS. 6A-6C and 14, where the basket is configured to nest within basket well 642, a circumferential motor 662 may be configured to interface with basket well 642 in order to rotate basket well 642. With reference also to FIGS. 8 and 9, the basket well may comprise a track 801, 901 comprising a plurality of teeth disposed around the circumference of the basket well. Track 801, 901 may be thus configured to interface with a spinning gear 604 of circumferential motor 662, such that motor 662 causes basket well 642 to rotate when spinning gear 604 rotates in conjunction with track 801, 901. In some embodiments, spinning gear 604 may be configured to have a diameter that is substantially smaller than the diameter of basket well 642. With spinning gear 604 located at the circumference of basket well 642, the space available for cooking food in basket well 642 increases, for example, because neither a drive shaft nor another component is located in the center of the basket well. Basket well 642 may further be configured to rotate in conjunction with bearings, gears, tracks and the like located substantially at the circumference of basket well 642. Such rotation will be discussed further below. Such exemplary embodiments do not require a center shaft (such as shaft 90), thereby increasing the room available for frying food in the frying basket.

Figure 12:
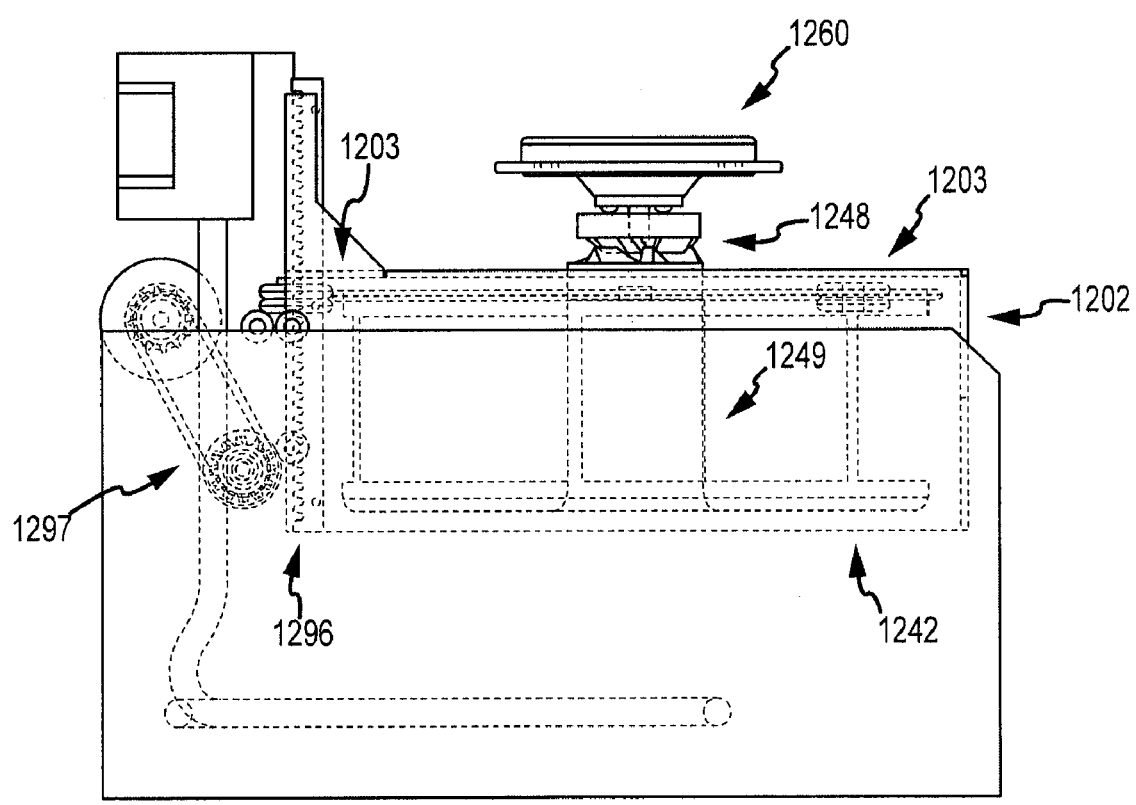
FIG. 12 illustrates a side view of a fryer device according to an exemplary embodiment of the present invention.

In a further embodiment, and with reference to FIG. 12, fryer device 1210 may comprise spinning motor 1260 configured to interface with center portion 1249 of basket well 1242 via a basket well gear such as well coupling 1248. Spinning motor 1260 may comprise a spinning gear configured to interface with well coupling 1248. In some embodiments, the spinning gear and the well coupling may comprise substantially the same diameter, and the well coupling and spinning gear may be configured to share an axis of rotation that is substantially the same as the axis of rotation for the basket well. As such, spinning motor 1260 is configured to cause basket well 1242 to rotate about an axis centrally located within basket well 1242 and center portion 1249; however, unlike the embodiment illustrated in FIG. 1, basket well 1242 does not depend, for rotation, on a shaft (like shaft 90) that shares the same axis as the axis about which basket well 1242 rotates. Rather, with reference also to FIGS. 6A-6C, basket well 642 may be configured to rotate in conjunction with bearings, gears, tracks and the like located substantially at the circumference of basket well 642, 1242.

It should be noted that in certain embodiments as discussed above, it may not be necessary to employ a top cover or any other cover to enclose the fryer device. The centrifugal force developed by spinning the basket and/or basket well may be sufficient to maintain the food and oil within the basket such that a cover is not needed.

Figure 6A:
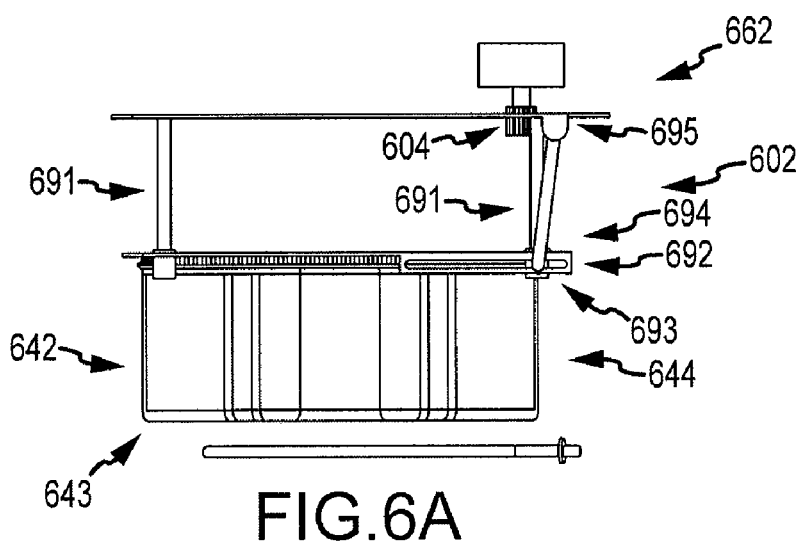
FIG. 6A illustrates a schematic of a portion of a frame section and basket well according to an exemplary embodiment of the present invention.
Figure 6B:
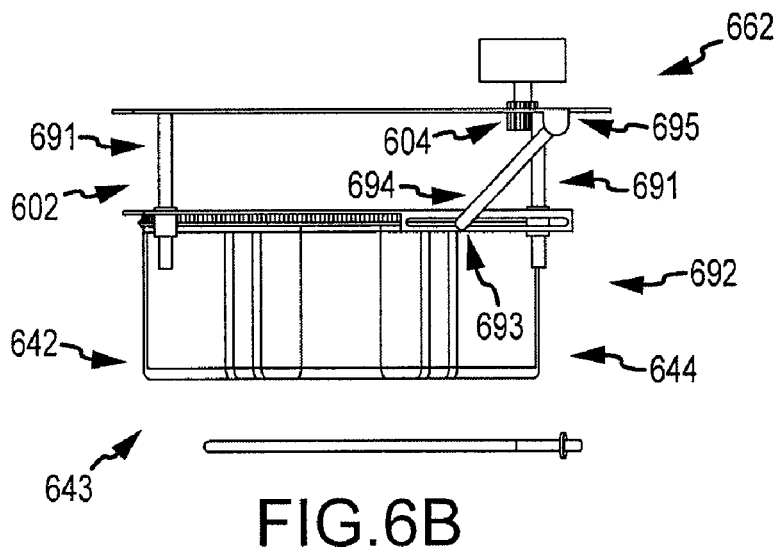
FIG. 6B illustrates a schematic of a portion of a frame section and basket well according to an exemplary embodiment of the present invention.
Figure 6C:
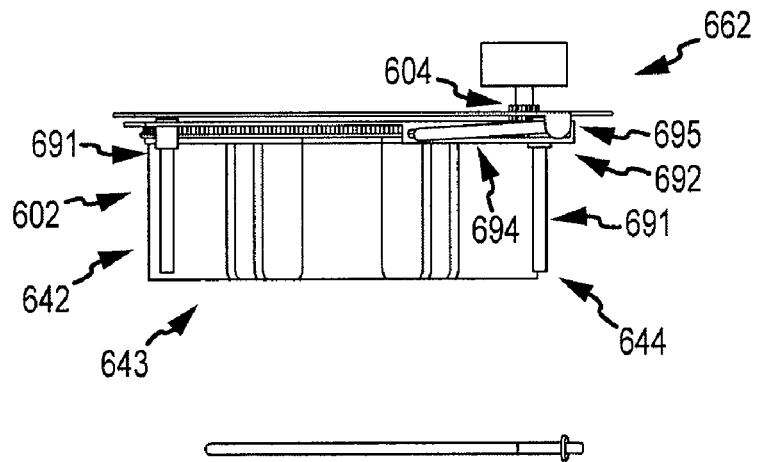
FIG. 6C illustrates a schematic of a portion of a frame section and basket well according to an exemplary embodiment of the present invention.
Figure 13:
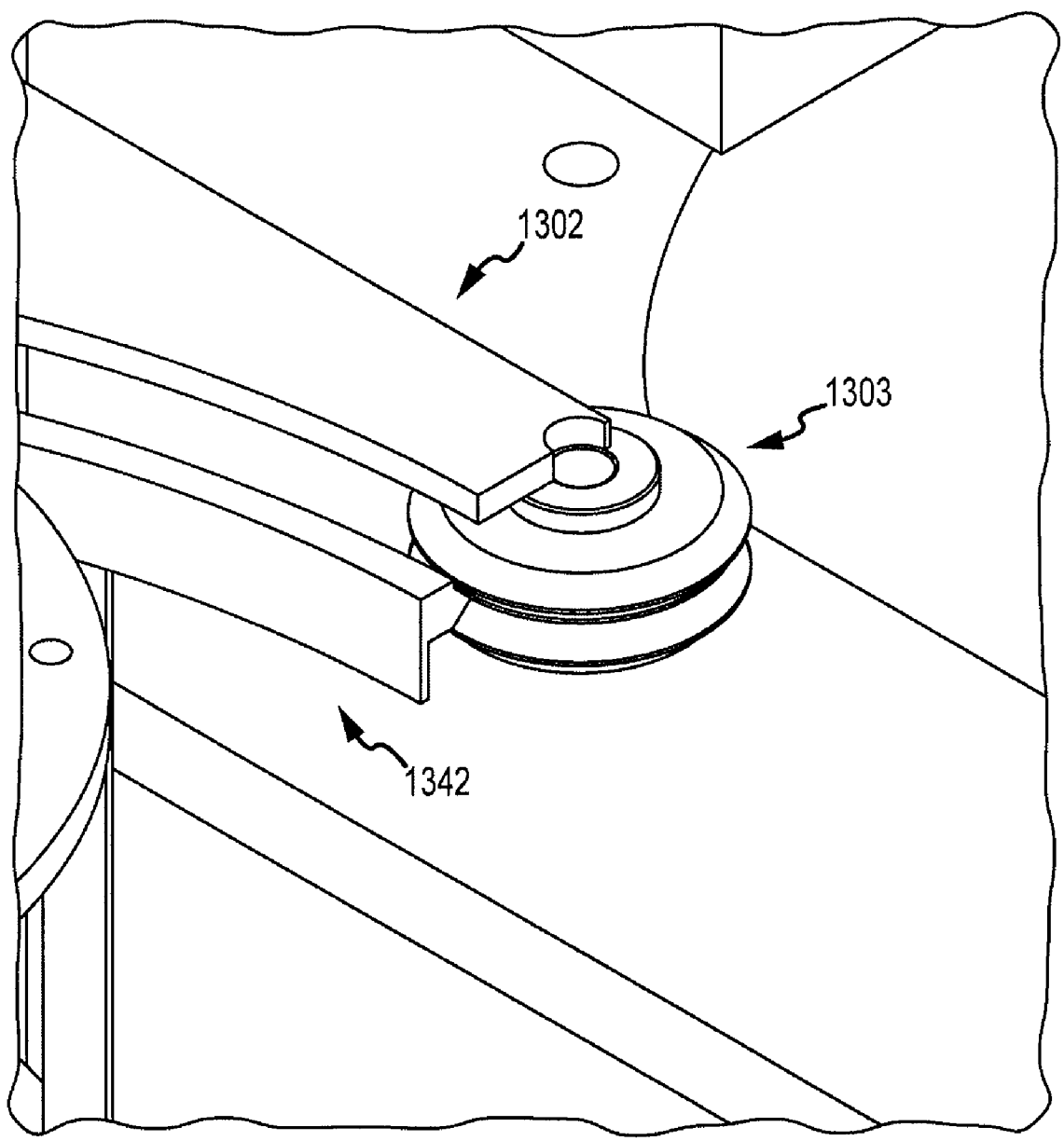
FIG. 13 illustrates a cut-away view of a portion of a frame structure according to an exemplary embodiment of the present invention.
Figure 14B:
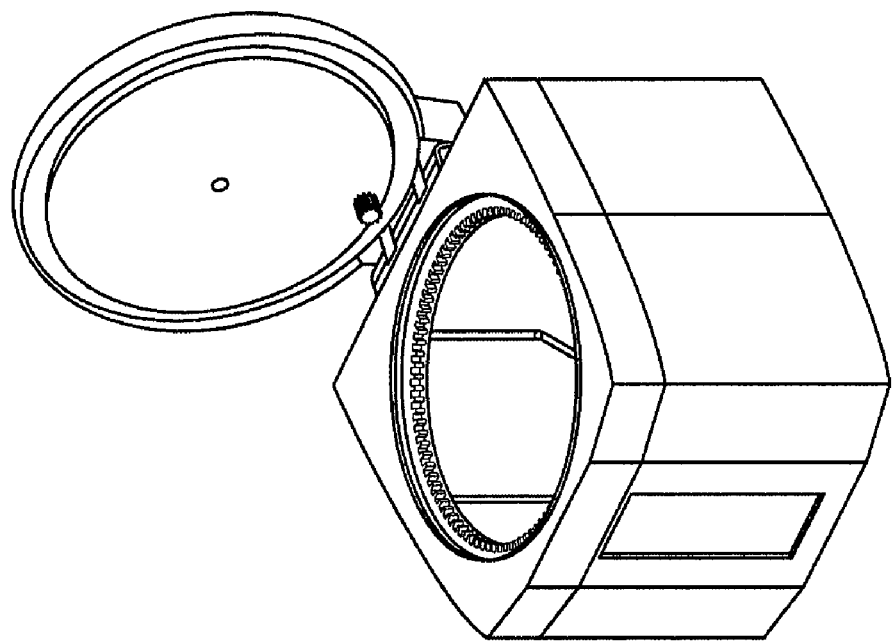
FIG. 14B illustrates a perspective view of a fryer device according to an exemplary embodiment of the present invention.
Figure 14A:
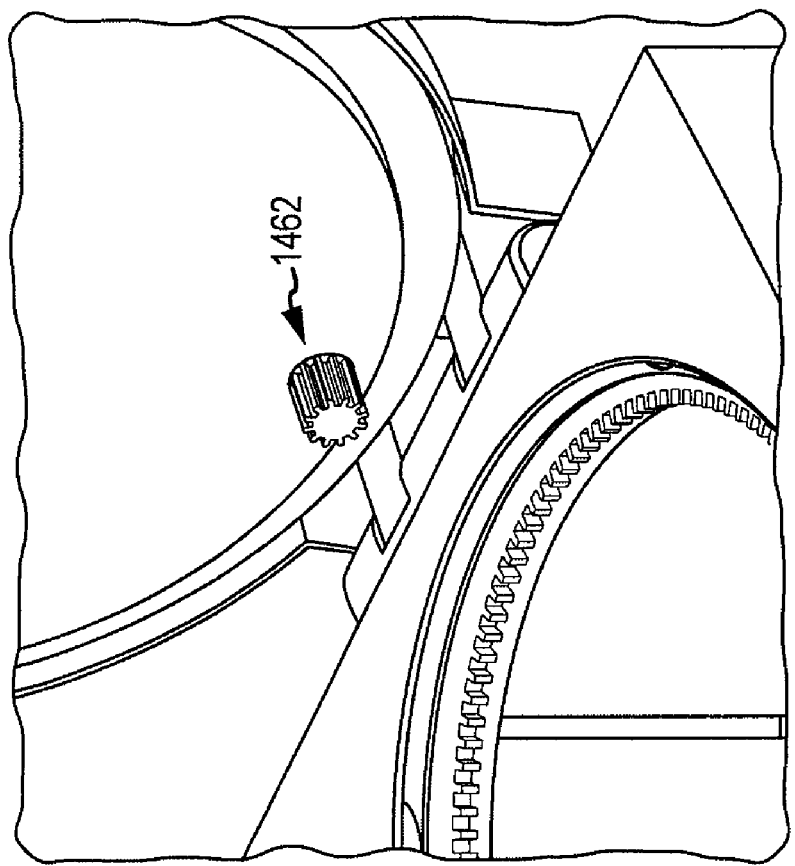
FIG. 14A illustrates a cut-away view of a portion of a fryer device according to an exemplary embodiment of the present invention.

According to other embodiments, with continued reference to FIGS. 6A-6C, basket well 642 may be secured to a frame structure 602. Frame structure 602 may be configured to comprise a number of the components disclosed herein as part of the fryer device. For example, with reference also to FIGS. 12 and 13, frame structure 1202, 1302 may comprise a plurality of bearings 1203, 1303. The bearings may comprise grooves that are configured to interface with a bearing surface on basket well 642, 1242, 1342 and to allow rotation of the basket well with respect to the frame structure and the fryer device. In some embodiments, each of the bearings 1203, 1303 may individually comprise a plurality of bearings. For example, bearings 1203, 1303 may each be configured to comprise two horizontally-oriented bearings that abut each other creating a v-shape that receives an inversely-shaped portion of the bearing surface on the basket well. In other embodiments, the portion of the bearing surface on the basket well may be v-shaped, and the plurality of bearings may be configured to receive the v-shaped portion of the bearing surface.

It should be understood that these bearing configurations are only exemplary, and any other rotational mechanism configured to allow rotation of the basket well within the frame structure, including where the rotational mechanism is located substantially at the circumference of the basket well, is contemplated within the scope of the present invention. For example, the frame structure may comprise a male track configured to interface with a female track located on the basket well. In other embodiments, the track on the basket well may be a horizontally oriented track, and the lower side of the horizontally oriented track may be configured to interface with roller bearings located on the frame structure. The frame structure may be movable with, or comprise a portion that is movable with the basket well, such that the basket well and the mechanism for allowing the basket well to rotate may be movable together between the spinning section and the oil section.

Figure 7C:
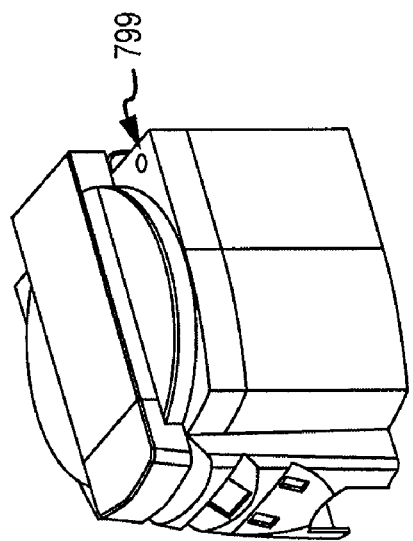
FIG. 7C illustrates a perspective view of an exemplary embodiment of the present invention.
Figure 7B:
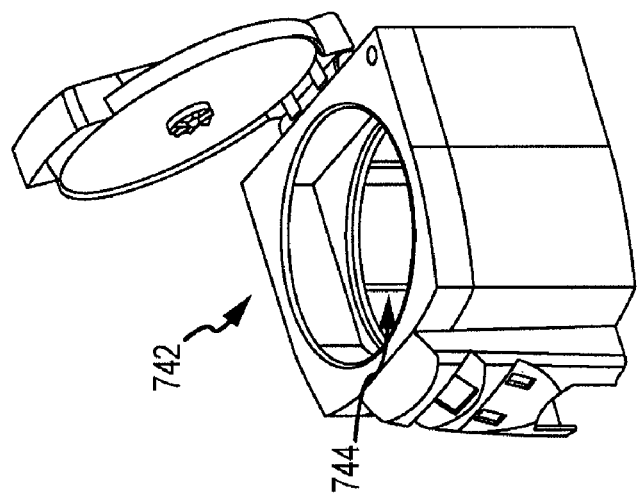
FIG. 7B illustrates a perspective view of an exemplary embodiment of the present invention.
Figure 7A:
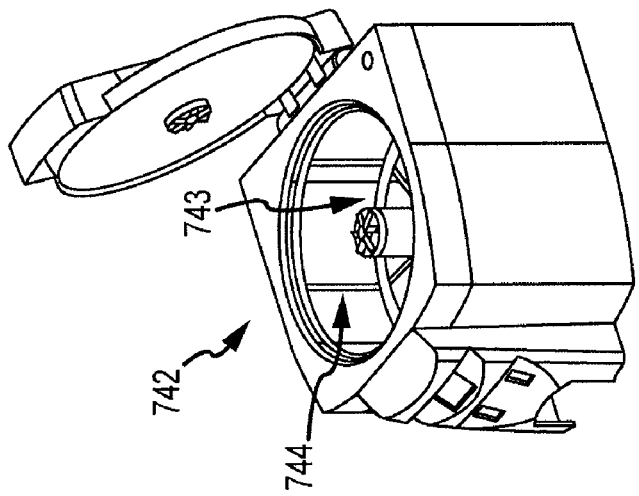
FIG. 7A illustrates a perspective view of an exemplary embodiment of the present invention.

Various embodiments configured to allow rotation of the basket well via a circumferentially-located track may be configured to reduce vibration compared to fryer devices that comprise a centrally-located (with respect to the axis of rotation of the frying basket) drive shaft and/or drive guide. Where a central drive shaft is employed and the basket is rotated, vibration may be induced in part due to the lack of support at the circumference of the basket. This condition may be exacerbated if the food basket is out of balance because of the position of the food. In exemplary embodiments of the invention, for example as illustrated in FIGS. 6A-9, where a circumferentially located track interfaces with bearings in the frame structure, support is provided at the circumference of the basket. Therefore, when the basket is rotated, vibration is reduced. Such configurations may allow the fryer device of the present invention to be produced in a counter-top version, for example as illustrated in FIGS. 7A-7C. These counter-top versions are configured to provide quieter operation that may be desirable in a home kitchen environment.

In embodiments comprising the frame structure, various mechanisms may be employed to facilitate the raising and lowering of the basket well. For example, with reference again to FIGS. 6A-6C, guide shafts 691, may be configured to interface with frame structure 602 in order to facilitate the raising and lowering of the basket. Guide shafts 691 may be configured to pass through the centers of bearings 1203, 1303, and or guide shafts 691 may be configured to be secured to frame structure 602 without passing through the bearings.

In other embodiments, a slider track 692 may be located on a portion of frame structure 602 that is movable between the oil section and the spinning section together with basket well 642. A slider 693 may be positionable within slider track 692 and may be rotatably attached to arm 694, such that when arm 694 rotates about fixed point 695, slider 693 moves horizontally within slider track 692, and slider track 692 and basket well 642 move vertically between the spinning section and the oil section. A motor may be employed at fixed point 695 to facilitate the automated movement of the basket well between the oil section and the spinning section. In other embodiments, arm 694 may be manually movable such that basket well 692 is manually movable between the oil and spinning sections.

According to still other embodiments, and with reference to FIG. 12, basket well 1242 may be movable between the oil and spinning sections by operation of a vertical gear 1296. Vertical gear 1296 may be secured to basket well 1242 or to any other component configured to facilitate the lowering of basket well 1242 out of the spinning section. Vertical gear 1296 may be configured to interface with a motor-gear structure 1297, such that when motor-gear structure 1297 rotates, vertical gear 1296 moves vertically, causing basket well 1242 to move between the oil and spinning sections. For example, motor-gear structure 1297 may comprise a rotary motor that is configured to rotate a gear having a parallel axis of rotation to that of the rotary motor, but that is displaced from the rotary motor. The rotary motor may be configured to rotate the gear by means of a drive belt and/or drive chain. In other embodiments, the rotary motor may comprise a rotary gear or plurality of rotary gears configured to interface directly with vertical gear 1296. As the gear rotates, it causes vertical gear 1296 to move up and down, thereby causing frame structure 1202 and basket well 1242 to also move up and down. In such an embodiment, guide shafts 691 may or may not be employed to guide basket well 1242 between the oil and spinning sections.

In further embodiments, any mechanism may be used to vertically translate the frame structure between the oil and spinning sections (and vice versa) that is now known or hereafter developed. For example, instead of motor-gear structure 1297, a direct drive motor may be employed to interface directly and/or via a gear or series of gears with vertical gear 1296. In still other embodiments, a lead screw may be configured to interface with the bottom of the basket well in order to facilitate movement of the basket well between the oil and spinning sections. In further embodiments, various belts, chains, pulleys, motors, cranks, cams, and the like may be employed to provide the desired movement of the basket well.

With reference back to FIG. 1, when starchy and/or battered foods are deep fried, they tend to stick together if they are not agitated and/or mixed during frying. Causing basket 40 to spin while in oil section 20 agitates and/or mixes the food within basket 40 and thereby discourages the food from sticking together. Spinning basket 40 within oil section 20 further facilitates the frying process by mixing the oil and thereby redistributing the heat throughout oil section 20. An agitation motor, such as rotational motor 65 may also be used to agitate basket 40 in oil section 20 by periodically switching directions of the rotation of basket 40. For example, rotational motor 65 can turn basket 40 for one-half of a rotation and then switch directions and turn basket 40 in the reverse direction for one-half of a rotation. In other embodiments, rotational motor 65 agitates, rotates, or otherwise moves basket 40 in spinning section 30. In various embodiments, rotational motor 65 may be powered by batteries, direct current, alternating current, solar power, gasoline, and the like.

According to other embodiments of the invention, linear motor 50 is operable to induce agitation in basket 40 while basket 40 is in oil section 20. For example, linear motor 50 may repeatedly move basket 40 up and down through a certain displacement, such as through a one-half inch displacement. These movements result in the food in basket 40 being agitated and/or mixed such that the food does not stick together and such that the food cooks more efficiently. Another embodiment of the invention comprises a cam that is operable to produce the desired vibratory agitation. Thus, according to these embodiments, basket 40 is capable of being rotated both within spinning section 30 and within oil section 20 during the same frying process for an item of food without opening top cover 16. Leaving top cover 16 closed between the frying and spinning processes decreases temperature loss from the food and increases the desirable characteristics of the food.

Various embodiments of the present invention allow different combinations of motors to produce the desired rotation, translation, and/or agitation of basket 40. For example, linear motor 50 may be the only motor, rotational motor 65 may be the only motor, and spin motor 50 may be the only motor. When only one motor is present in fryer device 10, that motor may be capable of providing all of the desired movement and/or a certain number of the desired movements. In certain embodiments, rotational motor 65 is operable to move basket 40 between sections, to rotate basket 40 in both sections, and to agitate basket 40 in oil section 20. In other embodiments, two motors may be used, and in still other embodiments, more than two motors may be used, for example, one motor each for agitation, translation, and rotation. Motors may also be used to open and/or close the fryer cover and/or drawer. Further embodiments allow for manual user intervention to provide any of the desired rotation, translation, agitation and/or operation of other components.

It should be noted that various embodiments of the invention comprise motors that operable at various and/or variable speeds. In certain embodiments, it may be desirable to alter the speed of the motors during spinning of the fried food, during the raising and lowering of the basket, the basket well, and/or the frame structure, during the adding of the food to the fryer device, during the removal of the food from the fryer device, and/or during the adding and/or filtering of the frying oil. In still other embodiments, the speed of the motors may be changed depending on the type of food being cooked. For example, where the food is more delicate, the motors may be configured to spin the cooked food at a lower speed, so that the centrifugal force exerted on the food is less. Or, it may be desirable to start the spin cycle at one speed to allow the food to position itself on the outside of the basket and then modify the spin speed to remove more oil and/or conduct convection cooking. Any motor operable to achieve these functions and/or other functions of the fryer device may be configured to be variable speed motors. The speed of the variable speed motors may be manually and/or automatically controlled as discussed further below.

In accordance with a further exemplary embodiment of the present invention, an exemplary fryer comprises mechanisms for automatically and/or manually controlling fryer device 10. Any of the procedures, processes, methods, and/or movements disclosed herein may be capable of automation, and any such automations now known or hereafter developed are contemplated within the scope of the present invention. For example, a user many manually crank basket 40 in order to remove excess oil from the fried food. In other embodiments, and with reference again to FIG. 1, controller 55 controls operation of at least one function and/or component of fryer device 10. Controller 55 may comprise any type of controller known in the art for controlling electrical and/or mechanical systems. As a motor controller, controller 55 may direct the operation of linear motor 50 to move basket 40 between oil section 20 and spinning section 30, and may direct spin motor 60 to rotate basket 40 about its vertical axis. A controller may also be used with the embodiments illustrated in FIGS. 6A-14 to accomplish the various movements contemplated in those embodiments. In still other embodiments, controller 55 accepts input from a user for air temperature, oil temperature, oil viscosity, cook time, spin time, oil level, and other factors a user would want to control in relation to the operation of fryer device 10. In further embodiments, controller 55 may control automatic extraction of the food from fryer device 10 when the frying and spinning processes are complete. Controller 55 may also control automatic operation of a filtering system that removes impurities and other undesirable items from cooking oil 22. Controller 55 may also control additional motors, such as rotational motor 65, circumferential motor 662, and spinning motor 1260, and may control other fryer device functions, such as agitation of basket 40 in oil section 20. Controller 55 may comprise, control, and/or communicate with various sensors, such as temperature sensors, and other components within fryer device 10. Controller 55 may be preprogrammed with various cooking procedures to fully automate the adding of the food to the fryer device, the cooking of the food, the removal of the oil from the food, and/or the removal of the food from the fryer device. As discussed further below, controller 55 may comprise any device capable of processing data, such as a microprocessor, a series of logical gates, a computer, and the like.

Figure 3A:
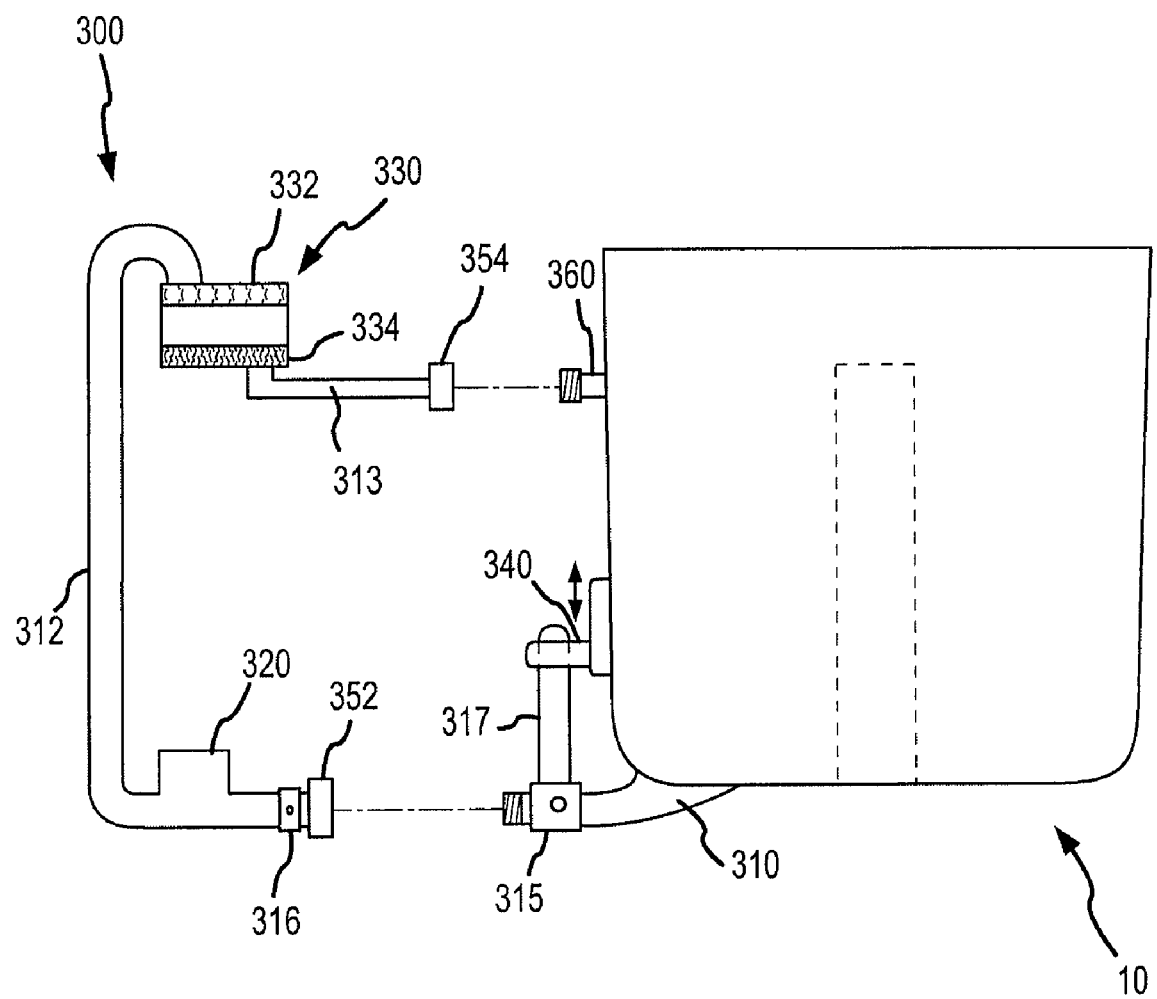
FIG. 3A illustrates a side view of a frying apparatus and filtering system according to an exemplary embodiment of the present invention.
Figure 3B:
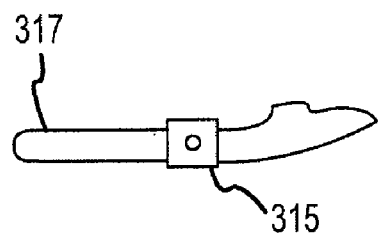
FIG. 3B illustrates a side view of a valve portion of a filtering system according to an exemplary embodiment of the present invention.

According to various embodiments of the present invention, it is desirable to remove impurities from cooking oil 22. With reference to FIG. 3, a filter system 300 for use with fryer device 10 according to an embodiment of the invention is now described to provide such a function. In certain embodiments, filter system 300 comprises an integrated oil filter for removing the impurities from cooking oil 22. Filter system 300 is operable to manually or automatically remove sediment, fried food particles, impurities, and other undesirable particles from cooking oil 22. For filter system 300 to be functional in some embodiments, a safety latch 340 is switched to an operating position. Cooking oil 22 then exits fryer device 10 via an exit pipe 310 and enters filter system 300 via a valve 315 and/or another valve 316. Valves 315 and 316 may be any valves capable of controlling the flow rate of fluids such as cooking oil 22 in a heated or cooled state. A valve switch 317 controls operation of valve 315 and controls the flow rate of cooking oil 22 into filter system 300. Exit pipe 310 and valve 315 are coupled to valve 316, pump 320, and transfer pipe 312 via female coupling 352.

A pump 320 moves cooking oil 22 through a transfer pipe 312, a filter box 330, and a return pipe 313 so that filter system 300 can return the filtered oil to fryer device 10. Pump 320 may be any device capable of pumping a fluid such as cooking oil 22 in a heated or cooled state.

Filter box 330 is operable to remove sediment and other undesirable particles from cooking oil 22. Filter box 330 comprises, according to various embodiments, at least one filter for filtering cooking oil 22. In certain embodiments, Filter box 330 comprises a wire mesh filter 322 and a fine filter 334. In other embodiments, filter box 330 comprises only one filter.

The filtered cooking oil exits filter box 330 via return pipe 313. Return pipe 313 is coupled to fryer device 10 via a female coupling 354 and a return port 360. Return port 360 receives the filtered cooking oil and returns the filtered cooking oil to oil section 20 for further frying processes. In certain embodiments of the invention, filter system 300 is thermally insulated in order to minimize the temperature drop between exit pipe 310 and return port 360 so as to minimize energy required to reheat the filtered cooking oil. Filter system 300 is operable during the frying process, during the spinning process, after both processes are finished, and at other times during operation of fryer device 10. Filter system 300 is configured so as not to interfere with any of the operations of fryer device 10, including the automatic discharge process discussed below. The filter system may be controlled by controller 55, and a user may specify parameters of the filtering process for automatic control by controller 55.

In an exemplary embodiment of the invention, fryer device 10 is capable of automatic operation following insertion of the uncooked food into basket 40, including the automatic process of discharging the cooked food from fryer device 10. In other embodiments, the uncooked food may be loaded into the fryer device through intake chute 445. With reference to FIGS. 4A-4E, exemplary embodiments of the automatic discharge process are described. The automatic discharge process involves automatically opening top cover 16, removing basket 40 from frying vessel 14 and discharging the cooked food down a food exit chute such as discharge chute 440. Controller 55 communicates with and controls the automatic operation of the various components involved in the automatic discharge process.

According to further embodiments of the invention, fryer device 10 comprises a basket retrieval mechanism. In certain embodiments, the basket retrieval mechanism comprises servos 410, 412 for automatically discharging the cooked food. Servo 410 is operable to open top cover 16 upon completion of the frying and spinning processes. Servo 412 is operable to control discharge arms 414, 415. Servos 410, 412 are configured to provide rotational, translational, and/or clamping movement and may be any devices capable of providing such movement. The servos may be operated by battery power, alternating current power, direct current power, gas power, and other mechanisms for providing power.

Figure 4A:
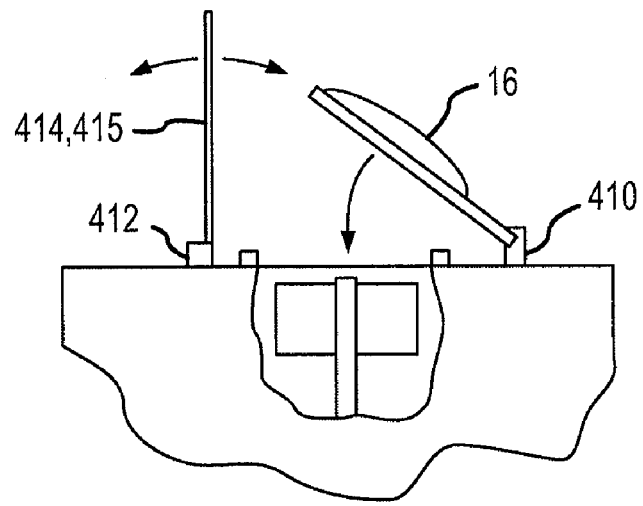
FIG. 4A illustrates a partial cross-section of a frying apparatus according to an exemplary embodiment of the present invention.
Figure 4C:
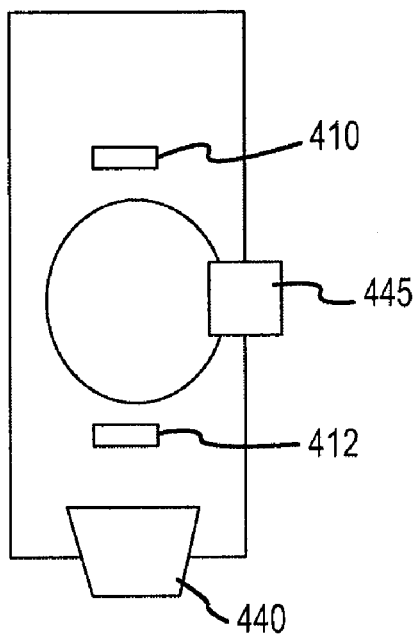
FIG. 4C illustrates a top view of a frying apparatus according to an exemplary embodiment of the present invention.
Figure 4B:
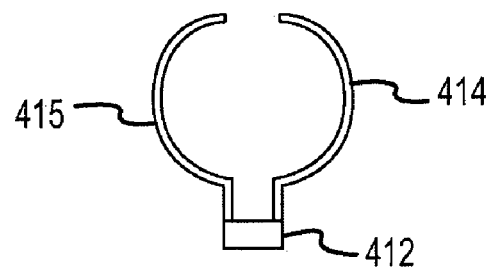
FIG. 4B illustrates a top view of a servo and discharge arm assembly according to an exemplary embodiment of the present invention.
Figure 4D:
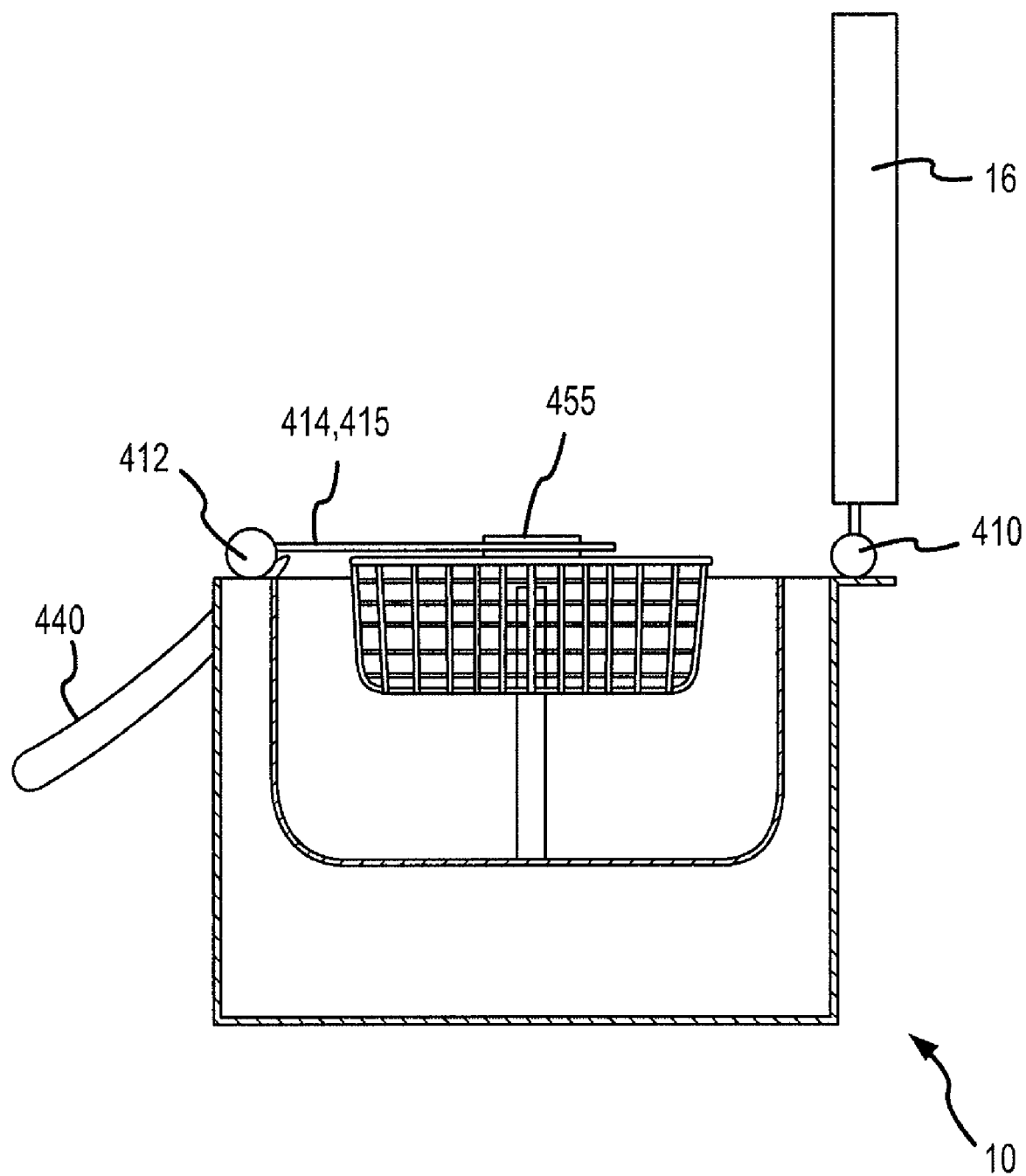
FIG. 4D illustrates a cross-section of a frying apparatus according to an exemplary embodiment of the present invention.
Figure 4E:
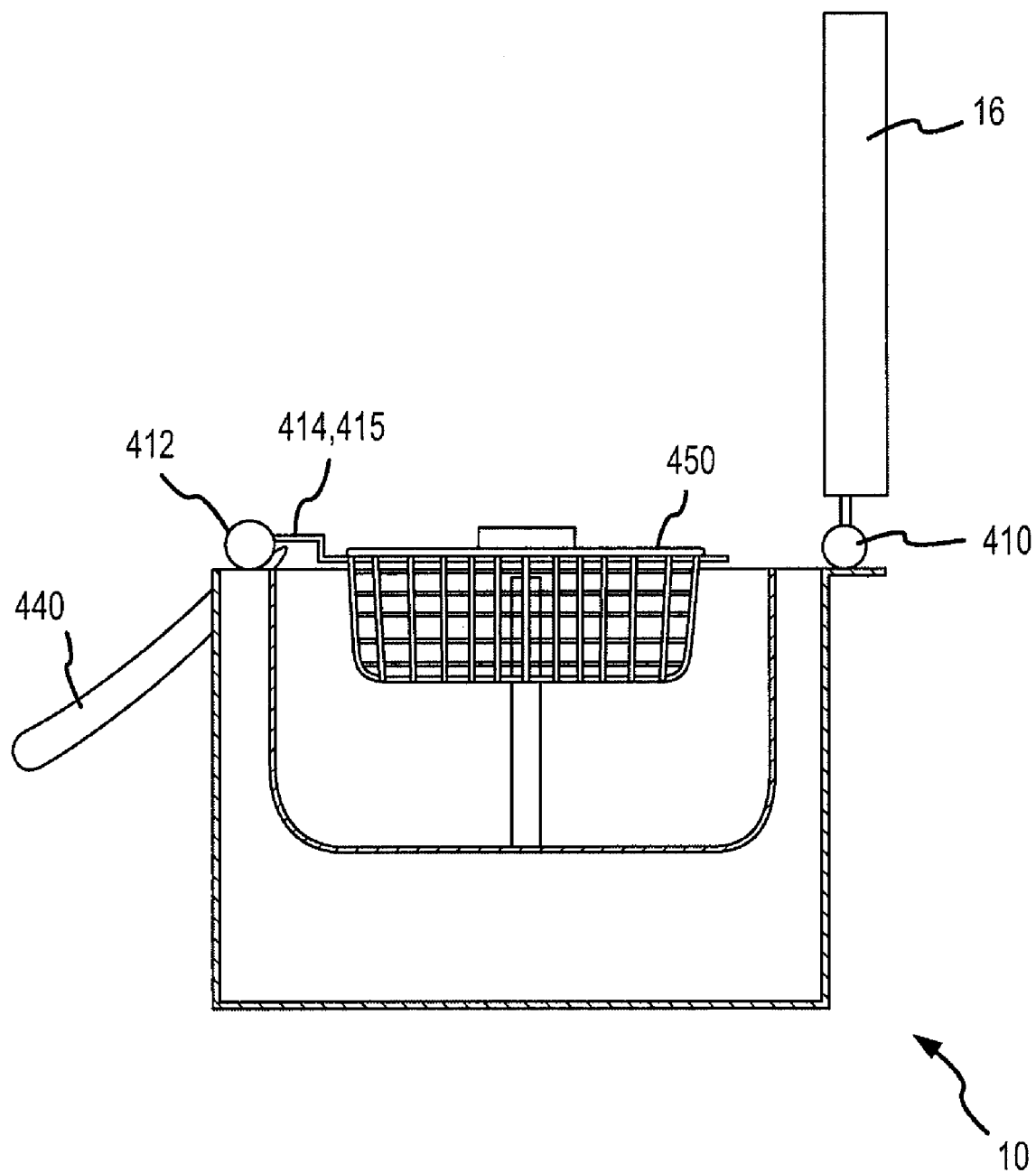
FIG. 4E illustrates a cross-section of a frying apparatus according to an exemplary embodiment of the present invention.

FIG. 4B shows a configuration of discharge arms 414, 415 according to one embodiment of the invention. Discharge arms 414, 415, in this embodiments, are configured to interface with stabilizing ring 450 and/or discharge ring 455 on basket 40 (See FIGS. 4D, 4E). Servo 412 rotates discharge arms 414, 415 into place around stabilizing ring 450 and/or discharge ring 450. In some embodiments, discharge arms 414, 415 snap into place around stabilizing ring 450 and/or discharge ring 450. In other embodiments, servo 412 and/or other devices are operable to clamp discharge arms 414, 415 into place around stabilizing ring 450 and/or discharge ring 455. With discharge arms 414, 415 in place, servo 412 rotates basket 40 out of frying vessel 14, and the cooked food exits fryer device 10 via discharge chute 440. A user may place a bowl, pan, plate or other utensil proximate discharge chute 440 so that the utensil will receive the cooked food from discharge chute 440.

In accordance with an exemplary embodiment of the present invention, fryer device 10 is configured to produce a cooked food that is more desirable than cooked foods produced by other frying methods. When the fried food is done frying in the oil, some oil has collected at the outside of the fried food. If the excess oil is removed before the fried food cools, up to 80% of the oil content of the fried food may be reduced. However, as an item of fried food, for example, a french fry, begins to cool, the outside of the french fry cools faster than the inside. This uneven cooling causes the excess oil at the outside of the french fry to be drawn to the center of the french fry, causing the french fry to become soggy and increasing the oil content of the fried food. In addition, as the outside cools, the food tends to contract, which has the effect of locking the oil into the food. Soggy french fries are generally not desirable for consumption. Increased oil in the french fry is also not desirable from a health standpoint. Thus, it is desirable for the temperature at the inside and outside of the french fry to be the same until it is served to a consumer. However, some presently-known frying processes employ a method for removing excess oil from the fried food after frying and before serving to a consumer. These processes generally remove the excess oil in an environment that contributes to rapid cooling of the food.

Exemplary embodiments of the present invention, on the other hand, comprise an excess oil removal process that is conducted in an environment that minimizes the cooling rate of the fried food. In one embodiment, the average temperature of the french fry (or other fried food) is $T_{avg}$. The closer $T_{avg}$ is to the temperature of cooking oil 22, $T_{oil}$, the less temperature difference there will be between the outside and inside temperatures of the french fry, assuming the entire french fry was at the temperature of the cooking oil when the frying was completed. It is therefore desirable to minimize $T_{oil}-T_{avg}$, or $\Delta T_{avg}$ at the time the french fries are served to a consumer. A cooling rate (C) can be calculated at a specified time after frying in the oil has been completed (tc):

$$C=\Delta T_{avg}/tc$$

For example, assuming an oil temperature of $T_{oil}=190°$ C., and cooling the fried food in an environment having a temperature of 27° C., at time after frying of tc=180 seconds, and an average temperature at 2 minutes of $T_{avg}=27°$ C., then $\Delta T_{avg}=163°$ C., and C=0.91° C./second. On the other hand, assuming the other variables are the same, if $T_{avg}=155°$ C., then $\Delta T_{avg}=35°$ C., and C=0.194° C./second. In the scenario where C is higher, there is a greater likelihood of the french fries being soggy because more excess oil has been drawn to the center of the fried food, and/or the fried food has cooled too rapidly for the excess oil to be removed, making the fried food unhealthy and undesirable to consumers. Thus, it is important to minimize C.

It should be noted that according to other embodiments of the present invention, C may be a function of time, cooling conditions, thermal properties of the fried food, initial oil content of the fried food, geometry of the fried food, and the like. In certain embodiments, the convection heat transfer coefficient influences the cooling rate of the fried food. For example, if the ambient temperature where the fried food is being cooled is low, the heat transfer rate from the fried food will be greater. If air is moving past the fried food at the low ambient temperature, heat transfer will be further increased according to the speed of the air flow. Thus, moving air past the fried food is not desirable at a low ambient temperature because the fried food might cool more rapidly, thus preventing the removal of the excess oil before it collects at the center of the fried food. Thus, exemplary embodiments of the present invention provide a mechanism for moving air past the fried food in order to remove the excess oil at the surface of the fried food, but moving the air past the fried food at an elevated temperature in order to reduce the cooling rate of the fried food. According to an embodiment of the invention, the following table shows some theoretical temperatures of a fried food that is being cooled in different ambient temperatures, at different periods of time. An oil temperature of 190° C. is used. All temperatures are in Celsius, and the time is in seconds.

TABLE 1

| Time (s) | Ambient = 27° C. | Ambient = 65° C. | Ambient = 150° C. |
|---|---|---|---|
| 0 | 190 | 190 | 190 |
| 20 | 135 | 147 | 180 |
| 40 | 95 | 120 | 174 |
| 60 | 70 | 100 | 169 |
| 80 | 55 | 88 | 164 |
| 100 | 45 | 80 | 161 |
| 120 | 36 | 74 | 158 |
| 140 | 32 | 70 | 157 |
| 160 | 28 | 68 | 156 |
| 180 | 27 | 67 | 155 |

Thus, according to the embodiment expressed in Table 1, at 40 seconds after cooking, or tc=40 seconds, $\Delta T_{avg}(27)$=95° C., $\Delta T_{avg}(65)$=70° C., and $\Delta T_{avg}(150)$=16° C. The corresponding cooling rates are C(27)=2.375° C./second, C(65) =1.75° C./second, and C(150)=0.4° C./second. Thus, where the ambient cooling temperature is higher, C is lower, and more oil may be removed from the surface of the fried food during the spinning process. It should be noted that Table 1 is only representative of exemplary embodiments of the present invention, and other cooling rates, temperatures, and other parameters are possible depending on the specific operating conditions of a particular embodiment of the invention.

According to further embodiments of the invention, the temperature of the fried food is a function of time. For example, the temperature may be a third-order polynomial as a function of time. In other embodiments, the temperature profile may be exponential, linear, a power function, n-order polynomials, and other types of functions. In such embodiments, the cooling rate is also a function of time, characterized by the change in temperature over a change in time, or dT(t)/dt, or the first derivative of the temperature function. For example, where the temperature profile is a third-order polynomial, $T(t)=At^3+Bt^2+Dt+E$, and $dT(t)/dt=C(t)=3At^2+2Bt+D$.

Various exemplary embodiments of the present invention comprise methods of automatically reducing oil content of fried foods and minimizing C at the same time. For example, top cover 16 remains closed while basket 40 is moved out of oil section 20 and into spinning section 30. Top cover continues to remain closed while spin motor 60 and/or rotational motor 65 spins, agitates and/or moves basket 40 in order to remove oil from the fried food. Because top cover 14 remains closed after frying, the temperature surrounding the fried food remains at least close to, if not the same as, the temperature of cooking oil 22. Thus $\Delta T_{avg}$ approaches zero during the spinning process even while tc grows, resulting in a C that also approaches zero. Only after the oil removal process do $\Delta T_{avg}$ and C begin to grow appreciably. Other embodiments comprise controller 55 configured to monitor C via a sensor or plurality of sensors. Monitoring C allows controller 55 to automatically change the cook temperature, cook time, spin temperature, spin time, spin speed, and other variable in order to maintain a desirable C. Therefore, embodiments of the present invention provide fried foods with a reduced oil content that are nearly the same temperature as the fried foods with higher oil content that are served immediately after frying in oil. Such embodiments provide for greater removal of the excess surface oil of the fried foods. Other embodiments provide fried foods that are more desirable than fried foods produced by other methods, where the other methods remove oil content without minimizing C and thus facilitate the production of undesirable foods.

Other aspects of the invention provide systems such as a ventilation system and a fire suppression system. Such systems aid in the safe operation of the food fryer. Such systems also aid in maintaining a desirable operating environment. For example, the ventilation system may remove oil-filled heated air from the food fryer and replace it with fresh air. In certain embodiments, the fresh air may be preheated to aid in reducing the cooling rate of the fried food in the spinning section. In yet other embodiments, the spinning air created by basket 40 when it is being rotated, drives air out of spinning section 30 and into the venting system. In still other embodiments, the ventilation system may comprise an oil ventilation device for replacing used oil with new oil and/or reclaiming the used oil. The ventilation and fire suppression systems may be automatically and/or manually operated.

Further embodiments of the present invention comprise methods for reducing oil content from fried foods that are more efficient than previously-known methods for reducing oil content. As discussed above, top cover 16 remains closed during the oil removal process, which causes the temperature of the fried food to remain close to the temperature of cooking oil 22. At this elevated temperature, the cooking oil within and covering the fried food is less viscous. Because the oil is less viscous, it is more amenable to separation from the fried food during the oil removal process, thus making the oil removal process more efficient.

A method for automatically frying and reducing the oil content of a fried food according to an exemplary embodiment of the invention is now described. Fryer device 10 is provided, as well as a target food to be fried. A user instructs fryer device 10 with regards to the different variables involved in the frying process. For example, the user may specify a type of food, a quantity of food, a desired frying result (e.g., rare, medium-rare, medium, medium-well, well-done, etc.), an oil temperature, a frying time, an oil removal time (e.g., time for spinning), and the like. Controller 55 accepts the instructions and opens top cover 16 automatically upon the user's signaling that all instructions have been made. In other embodiments, top cover 16 may be manually opened by the user. The user loads the target food into loading chute 445 and instructs fryer device 10 to close top cover 16 and being the frying process. In other embodiments, some of the processes may be performed manually (e.g., manually opening the cover), and in still other embodiments, controller 55 may automatically determine certain operating parameters.

After top cover 16 is closed, fryer device 10 performs the frying process automatically. In certain embodiments, fryer device 10 has a manual override that allows the user to interrupt the automatic frying process. Controller 55 ensures cooking oil 22 is at the appropriate temperature by measuring the temperature and instructing heating element 80 to produce more or less heat. Controller 55 then instructs linear motor 50 to move basket 40 into oil section 20 to begin the frying process and/or perform manual tasks. While basket 40 is in oil section 20, basket 40 may be agitated, rotated, spun and/or otherwise moved in order to prevent the target food from sticking together and/or to facilitate the frying of the target food. Controller 55 may direct the moving of basket 40 in response to input from the user and/or as part of a pre-programmed routine. Controller 55 may communicate with and instruct various fryer device components in order to facilitate the movement of basket 40. For example, spin motor 60, linear motor 50, and/or rotational motor 65 may be instructed to move basket 40.

When controller 55 determines that the target food has been cooked according to the user's specifications, controller 55 instructs linear motor 50 and/or rotational motor 65 to move basket 40 into spinning section 30. Controller 55 further instructs basket 40 to begin spinning by instructing any of linear motor 50, spin motor 60, and/or rotational motor 65 to spin basket 40. A user may predetermine a spinning speed for basket 40 and controller 55 may operate the basket at the predetermined speed. Controller 55 may also automatically determine the required spinning speed depending on other operating conditions. In other embodiments, basket 40 need not spin, but may be moved in other ways that remove excess oil from the target food, for example, by agitation and/or ultrasonic motion. During the spinning process, according to some embodiments, controller 55 monitors the temperature of spinning section 30 and may instruct heating element 80 to increase its heat output in order to increase the temperature of cooking oil 22, thereby increasing the temperature in spinning section 30. During the spinning process, top cover 16 remains closed, thus minimizing the rate of temperature loss within the target food (C, as discussed above).

According to further embodiments, when controller 55 determines that the spinning process should be terminated, controller 55 ceases movement of basket 40 and instructs top cover 16 to open. Controller 55 may control top cover 16 via servo 410, for example. Controller 55 then instructs basket 40 to discharge the target food through discharge chute 440. Various methods of discharging the target food may be employed according to various embodiments of the invention, and one embodiment is disclosed here. For example, fryer device 10 may comprise servo 412 that is attached to discharge arms 414, 415. Discharge arms 414, 415 are configured to interface with basket 40 and to allow servo 412 to rotate basket 40 away from frying vessel 14 so as to discharge the target food through discharge chute 440. Controller 55 then returns basket 40 to frying vessel 14, and, depending on the user's instruction, may instruct cooking oil 22 to cool down. Although this embodiment has been described in terms of automated processes, manual processes may be employed to carry out the present invention.

Although the term "controller" has been used to describe the electronic and/or automated controlling of various processes, it should be appreciated that such functionality may be realized by any number of hardware and/or software components configured to perform the specified functions. For example, various embodiments may employ various integrated circuit components (e.g., memory elements, processing elements, logic elements, look-up tables, and/or the like), which may carry out a variety of functions under the control of one or more microprocessors or other control devices. Similarly, the software elements of the various embodiments may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and/or the like.

The "controllers" discussed herein may also comprise computing systems including a processor configured to process digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including cooking, temperature, food type and like data that may be used in association with the present embodiments. As those skilled in the art may appreciate, a user interface for each system described herein may be configured to include an operating system (e.g., Windows NT, 95/98/2000/XP/Vista, Linux, Unix, Solaris, etc.) as well as various conventional support software and drivers typically associated with computers.

Various information and data are described herein as being "stored." In this context, "stored" may mean that the information is kept on a database. In accordance with the various embodiments, a database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Databases may be organized in any suitable manner, including as data tables or lookup tables. Association of certain data may be accomplished through any data association technique known and practiced in the art. For example, the association may be accomplished either manually or automatically. Association techniques include common techniques such as using a key field in the tables to speed searches, sequential searches through all the tables and files, and sorting records in the file according to a known order to simplify lookup. In other embodiments, data may not be stored in a database, but may be stored by any other known means for storing data.

In accordance with various embodiments, any suitable data storage technique may be utilized to store data. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

An exemplary embodiment of the invention comprises a storage medium configured to provide instructions to a computer processor for carrying out the various cooking processes and steps disclosed herein. As used in this application, "storage medium" may be anything capable of storing information, for example, magnetic tape, RAM, ROM, compact disc media, flash memory, solid state memory, and the like. As mentioned above, a processor may be any device capable of reading and/or accessing the storage medium, and the processor may be configured to be part of the controller. In other embodiments, the processor may be separate from the controller.

In exemplary embodiments, the computer processor may be configured to receive a number of inputs from a user, such as food type, cook time, spin time, cook temperature, spin temperature, spin speed, and food result (e.g., rare, medium rare, medium, medium well, well). In some embodiments, the user may provide only some of the above inputs, and the processor may be configured to automatically calculate and/or produce the other inputs. Any inputs relevant to the functionality of the fryer device may be received from a user and/or produced automatically by the processor. The processor may be configured to receive the inputs from a user interface and/or via algorithms, pre-loaded instructions, and/or other processes that do not require user input.

The storage medium may further provide instructions to the processor such that the processor may be configured to (1) open and/or close the fryer drawer and/or lid; (2) move the basket well between the cooking and spinning sections; (3) maintain a desired temperature in the cooking and spinning sections; (4) allow the cooked food to remain in the cooking section for a desired cook time; (5) rotate the basket well and/or food basket in the spinning section for a desired spin time; (6) set speeds for the various motors; and/or (7) perform other functions contemplated within the scope of this disclosure. It should be understood that any of the above functions may be performed automatically by the processor, and/or certain of the functions may be performed by the processor, and others may be performed manually. In further embodiments, the storage medium may be configured to instruct the processor to store a number of pre-configured cooking procedures depending on various types of food, food results, users, operating conditions, and the like. Where such a pre-configured procedure is employed, a user may need to only make one or a limited number of choices, and the processor may then fully automatically complete the cooking process. In other embodiments, the processor may require user input at various times during the cooking process.

In an exemplary embodiment, a user may input a food type and a desired food result via a user interface on the frying device. In other embodiments, a user may provide inputs to the fryer device via a network connection, such as via Internet, Ethernet, cellular, wireless, wired satellite, infrared, radio frequency and the like network and/or communications systems.

Figure 5:
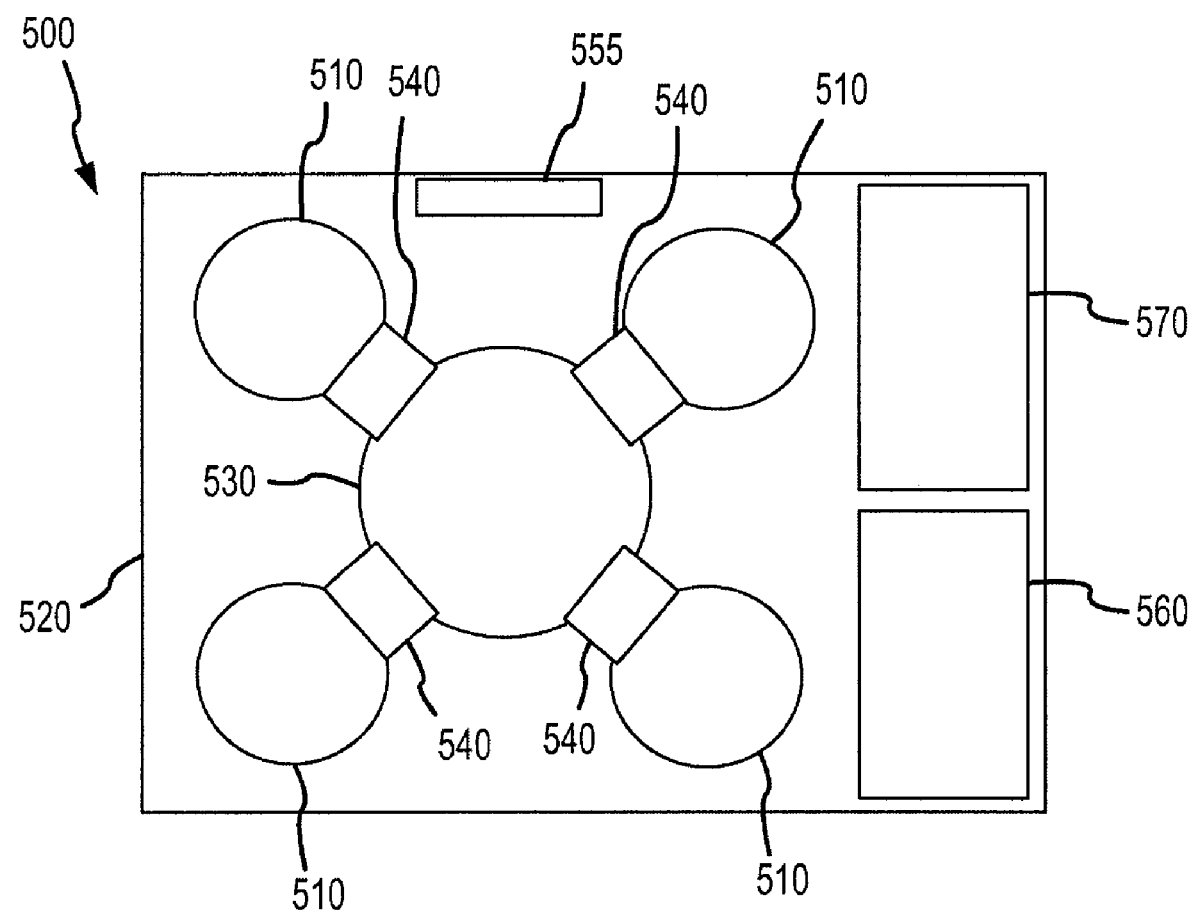
FIG. 5 illustrates a schematic of a frying system according to an exemplary embodiment of the present invention.

In accordance with another embodiment of the present invention, a frying system 500 capable of removing oil content from fried food is now disclosed with reference to FIG. 5. Frying system 500 comprises a system housing 520 which comprises a plurality of fryer devices 510. Fryer devices 510 may be similar in structure and may be operated in a similar manner to fryer device 10 discussed previously. Fryer devices 510 may also be any device capable of frying or otherwise frying food. System housing 520 further comprises a spinner 530 which receives fried food from fryer devices 510 via discharge chutes 540 and/or via manual placement of the fried food in spinner 530 by a user. After fryer devices 510 have cooked the fried food, spinner 530 receives the fried food and processes the fried food in order to remove excess oil content from the food. In certain embodiments, fryer devices 510 may carry out their own spinning and/or oil removal operations prior to depositing the fried food in spinner 530, or they may deposit the fried food directly after frying it in the cooking oil. System housing 520 also comprises a system controller 555 which communicates with and directs operation of the various components in frying system 500.

According to further embodiments, system housing 520 is configured to increase the safety associated with the operation of frying system 500. For example, system housing 520 may comprise a fire suppression system 570. Fire suppression system 570 is operable to automatically detect and extinguish fires within system housing 520. In other embodiments, a user can manually instruct fire suppression system 570 to extinguish a fire and/or a threat of fire within system housing 520. According to other embodiments, system housing 520 further comprises a ventilation system 560 for increased safety, circulation, and/or degree of desirable environmental conditions. In further embodiments of the invention, ventilation system 560 is operable to remove oil-filled, heated air from system 500.

In accordance with another embodiment of the present invention, frying system 500 comprises a frying system cover. The frying system cover reduces temperature loss to the surroundings of the frying system which decreases the cooling rate of the fried food during the spinning process. Frying system 500 may further comprise heating elements such as heat lamps, resistive heating elements, gas burners, and other mechanisms for providing heat. The heating elements within system housing 520 may regulate the temperature within system housing 520 and regulate the temperature of the fried food during the oil removal process.

In certain embodiments of the invention, spinner 530 may be present in system housing 520 and fryer devices 510 may not be present. In such an embodiment, fried food from fryers external to system housing 520 is placed in spinner 530 and then the frying system cover is closed. Spinner 530 removes excess oil from the fried food and frying system 500 maintains the temperature of the fried food during the spinning process.

In still other embodiments of the present invention, fryer devices 510 may be present in system housing 520 and spinner 530 may not be present. In these embodiments, fryer devices 510 are nearly identical to fryer device 10 discussed above. Each fryer device 510 is independently operated and controlled and/or operated and controlled in conjunction with the other fryer devices 510. After the settings for the fryer devices 510 have been inputted by a user. The frying system cover is closed and the fryer devices 510 operate automatically to produce the fried food. The fried food from each of the fryer devices may be deposited within a fried food receptacle within system housing 520, and the fried food may be kept warm in the receptacle by heat lamps, heating elements, and or other devices for heating an enclosed space. When all of the fryer devices 510 are finished, the frying system cover may be opened, and the fried food may be served. Such an embodiment increases the amount of fried food that may be produced and provides a mechanism for maintaining a desirable temperature of the fried food until it is served.

Figure 15B:
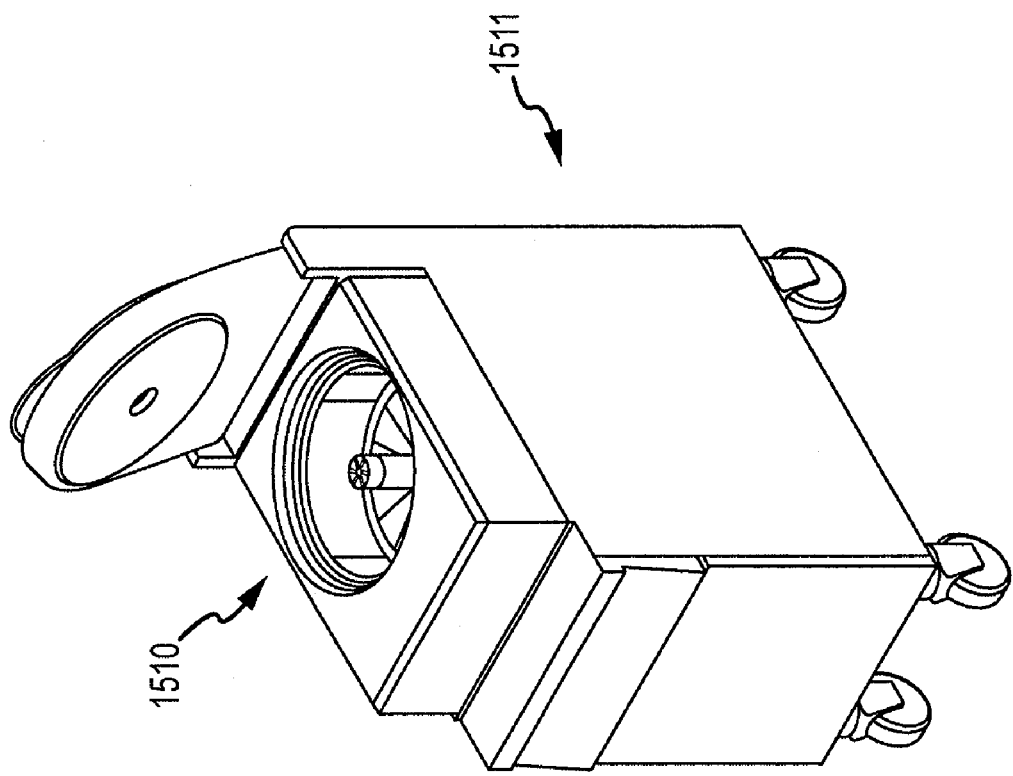
FIG. 15B illustrates a perspective view of a retrofit fryer device according to an exemplary embodiment of the present invention.
Figure 15A:
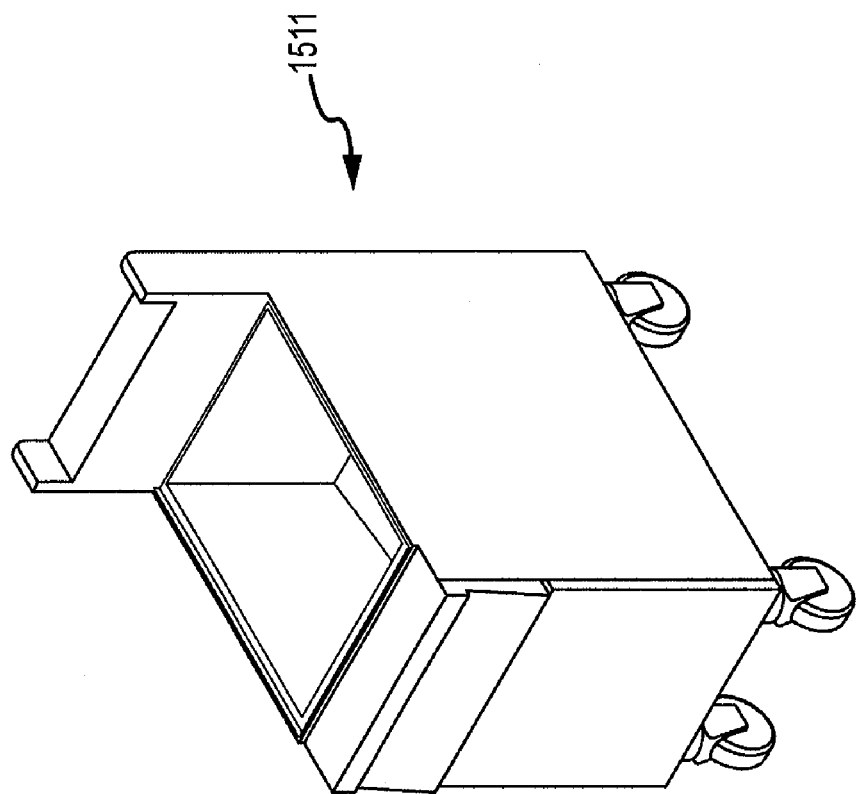
FIG. 15A illustrates a perspective view of a pre-existing fryer device according to an exemplary embodiment of the present invention.

In an exemplary embodiment, and with reference to FIGS. 15A-15B, retrofit fryer device 1510 may be configured to be retrofitted to a pre-existing fryer device 1511. The pre-existing fryer device 1511 comprises an oil-heating and cooking section where food is cooked, for example, by means of a basket manually lowered into the oil and then manually removed. In an exemplary embodiment, a retrofit surface of retrofit fryer device 1510 may be configured to abut and/or be attached or secured to pre-existing fryer device 1511. Retrofit fryer device 1510 may be configured to accept food into a basket, lower it into pre-existing frying vessel 1511 to fry the food, and then raise the food up for spinning in a heated, enclosed environment.

Exemplary retrofit fryer devices as disclosed here may further comprise a retrofit housing, and the retrofit housing may comprise a spinning section for removing oil from cooked food, and may comprise the retrofit surface. The retrofit housing may be configured to comprise several components, such as the frame, motors, bearings, guide shafts, and/or gears. These components may reside exclusively within the retrofit housing, or some of them may reside exclusively in the housing, and others may be extendable into the cooking section of the pre-existing fryer. It is desirable to keep some of the components out of the cooking section of the pre-existing fryer in order to protect them from the cooking fluid, such as oil, that is present in the cooking section of the pre-existing fryer. For example, with reference to FIGS. 6A-C, basket well 642 may be configured to extend below the retrofit surface and into the cooking section of the pre-existing fryer in order to enable the food to be cooked. But guide shafts 691, slider 693, slider track 692, motor 662, gear 604, and/or other components may not extend outside of the retrofit housing, or they may only partially extend outside of the retrofit housing.

Pre-existing fryers such as pre-existing fryer device 1511 generally already contain the frying vessel, oil section, and necessary heating element(s). A substantial amount of space may have been allocated for such devices, which tend to be large and expensive. Instead of completely replacing the pre-existing fryers at a substantial cost, this invention allows the pre-existing fryers to be used in conjunction with retrofit fryer device 1510 in order to provide the various advantages associated with the present invention.

It should be noted that while any of the fryer devices disclosed herein may be configured to be retrofitted to pre-existing fryer devices, an exemplary embodiment of retrofit fryer device 1510 does not comprise any component other than the basket well that needs to be submerged into the cooking oil of pre-existing fryer device 1511. For example, with reference to FIGS. 1 and 2, fryer device 10 comprises a shaft 90 that runs through oil section 20. However, with reference to FIGS. 8, 9, and 12, there are no components that reside within and/or pass through the oil section; rather, substantially all the components (with the exception, for example, of the heating elements) are located within the spinning section. Therefore, the embodiments illustrated in FIGS. 8, 9, and 12 would be more amenable to retrofitting because they would not require the insertion of any components other than the basket well into the oil section of pre-existing fryer device 1511. Retrofit fryer device 1510 according to these embodiments would sit on top of and/or be attached to the top of pre-existing fryer device 1511.

Various principles of the present invention have been described in exemplary embodiments. However, many combinations and modifications of the above-described structures, arrangements, proportions, elements, materials, and components, used in the practice of the invention, in addition to those not specifically described, can be varied without departing from those principles. Various embodiments have been described as comprising automatic processes, but these process may be performed manually without departing from the scope of the present invention.

We claim:

1. A cooking device, comprising:
   a basket well comprising a food basket;
   a cooking section configured to maintain a cooking liquid for cooking a food;
   a liquid removal section situated above the cooking section and configured to at least partially remove the cooking liquid from the food;
   a centrifugal liquid removal device configured to spin the food basket comprising a rotational motor;
   a translational motor configured to move the food basket vertically between the cooking section and the liquid removal section; and
   a slidable drawer configured to move between a cooking position and an open position in a substantially horizontal plane, wherein the centrifugal liquid removal device is disposed within the slidable drawer.

2. The cooking device of claim 1, wherein a first heating element is disposed within the cooking section, and wherein a second heating element is disposed within the liquid removal section.

3. The cooking device of claim 1, further comprising a drawer motor configured to facilitate moving the slidable drawer between the cooking position and the open position.

4. The cooking device of claim 1, wherein the rotational motor further comprises a spinning gear configured to interface with a basket well gear on the basket well.

5. The cooking device of claim 4, wherein the spinning gear comprises a diameter substantially smaller than the diameter of the basket well, and wherein the spinning gear interfaces with the basket well gear at the circumference of the basket well.

6. The cooking device of claim 5, wherein the basket well gear and the spinning gear comprise an axis of rotation substantially the same as an axis about which the basket well is configured to rotate, and wherein the basket well gear and the spinning gear comprise substantially the same diameter.

7. The cooking device of claim 1, wherein the food basket comprises at least one key configured to interface with the basket well.

8. The cooking device of claim 1, wherein the basket well comprises a screen configured to maintain food within the basket well.

9. The cooking device of claim 1, further comprising:
   a slider disposed within a slider track located on the basket well;
   a slider arm rotatably attached to the slider; and
   a motor rotatably attached to the slider arm.

10. The cooking device of claim 1, the translational motor comprising a rotating gear configured to mesh with a vertical gear attached to the basket well.

11. The cooking device of claim 1, the translational motor comprising a drive belt and a drive gear configured to drive a vertical gear attached to the basket well.

12. The cooking device of claim 1, further comprises at least one guide shaft configured to slidably interface with the basket well and facilitate the vertical motion of the basket well between the cooking section and the spinning section.

13. The cooking device of claim 1, further comprising a pressure relief mechanism.

* * * * *